(12) United States Patent
Müller et al.

(10) Patent No.: US 11,280,316 B2
(45) Date of Patent: Mar. 22, 2022

(54) ADJUSTMENT AND/OR DRIVE UNIT, WIND TURBINE HAVING SAME, AND METHOD FOR CONTROLLING SAME

(71) Applicant: Liebherr-Components Biberach GmbH, Biberach an der Riß (DE)

(72) Inventors: Johannes Müller, Buttenwiesen (DE); Martin Dahl, Wettingen (CH); Oliver Wennheller, Leutkrich (DE); Clemens Christ, Biberach (DE); Oliver Fenker, Warthausen (DE)

(73) Assignee: Liebherr-Components Biberach GmbH, Biberach an der Riß (DE)

( * ) Notice: Subject to any disclaimer, the term of this patent is extended or adjusted under 35 U.S.C. 154(b) by 482 days.

(21) Appl. No.: 16/461,773

(22) PCT Filed: Nov. 17, 2017

(86) PCT No.: PCT/EP2017/001357
§ 371 (c)(1),
(2) Date: May 16, 2019

(87) PCT Pub. No.: WO2018/091144
PCT Pub. Date: May 24, 2018

(65) Prior Publication Data
US 2019/0360459 A1  Nov. 28, 2019

(30) Foreign Application Priority Data

Nov. 18, 2016 (WO) ................ PCT/EP2016/001926

(51) Int. Cl.
*F03D 7/02* (2006.01)
*F03D 17/00* (2016.01)
(Continued)

(52) U.S. Cl.
CPC ......... *F03D 7/0204* (2013.01); *F03D 7/0224* (2013.01); *F03D 7/0248* (2013.01);
(Continued)

(58) Field of Classification Search
None
See application file for complete search history.

(56) References Cited

U.S. PATENT DOCUMENTS 8,899,920 B2 * 12/2014 Andersen ............... F03D 7/0204
416/1
10,100,810 B2 * 10/2018 Frederiksen ........... F03D 7/0244
(Continued)

FOREIGN PATENT DOCUMENTS

| CN | 101096941 | 1/2008 |
| CN | 101713375 | 5/2010 |

(Continued)

OTHER PUBLICATIONS

Search Report from Chinese Application No. 201780083192.9 dated Apr. 28, 2020 (9 pages).
(Continued)

*Primary Examiner* — Juan G Flores
*Assistant Examiner* — Jason Fountain
(74) *Attorney, Agent, or Firm* — Troutman Pepper Hamilton Sanders LLP; Ryan A. Schneider

(57) ABSTRACT

Adjustment and/or drive units that can be used in wind turbines to set the azimuth angle of the wind turbine nacelle or the pitch angle of the rotor blades, wherein such an adjustment and/or drive unit has at least two actuating drives for rotating two assemblies, which are mounted for rotation relative to each other, and has a control device for controlling the actuating drives, which control device controls the actuating drives in such a way that the actuating drives are braced in relation to each other during the rotation of the two
(Continued)

assemblies and/or at a standstill of the assemblies. The invention further relates to a wind turbine having such an adjustment and/or drive unit and to a method for controlling such an adjustment and/or drive unit.

47 Claims, 17 Drawing Sheets

(51) Int. Cl.
  *F03D 80/70* (2016.01)
  *F03D 80/00* (2016.01)
  *F03D 7/04* (2006.01)

(52) U.S. Cl.
  CPC ............. *F03D 7/047* (2013.01); *F03D 17/00* (2016.05); *F03D 80/00* (2016.05); *F03D 80/70* (2016.05); *F05B 2240/40* (2013.01); *F05B 2240/50* (2013.01); *F05B 2260/79* (2013.01); *F05B 2270/1095* (2013.01); *F05B 2270/32* (2013.01); *F05B 2270/321* (2013.01); *F05B 2270/328* (2013.01); *F05B 2270/329* (2013.01); *F05B 2270/331* (2013.01); *F05B 2270/335* (2013.01); *Y02E 10/72* (2013.01)

(56) References Cited

U.S. PATENT DOCUMENTS

| | | | |
|---|---|---|---|
| 10,107,262 B2 * | 10/2018 | Palomares Rentero | ..................... F03D 7/047 |
| 2007/0158926 A1 | 7/2007 | Hahmann | |
| 2011/0318178 A1 * | 12/2011 | Andersen | .............. F03D 7/0204 416/1 |
| 2013/0088009 A1 * | 4/2013 | Cousineau | ............ F03D 7/0204 290/44 |
| 2015/0275858 A1 * | 10/2015 | Frederiksen | ............ F03D 13/22 415/1 |
| 2015/0345470 A1 * | 12/2015 | Palomares Rentero | ..................... G05B 15/02 700/287 |

FOREIGN PATENT DOCUMENTS

| | | |
|---|---|---|
| CN | 104061123 | 9/2014 |
| DE | 10023440 C1 | 12/2001 |
| DE | 102007049386 A1 | 4/2009 |
| DE | 102008013864 A1 | 9/2009 |
| DE | 102013207322 A1 | 10/2014 |
| EP | 2101058 A2 | 9/2009 |
| EP | 2280191 A2 | 2/2011 |
| EP | 2290230 A2 | 3/2011 |
| EP | 2495435 A1 | 9/2012 |
| EP | 2781738 A1 | 9/2014 |
| EP | 2796710 A1 | 10/2014 |
| JP | 2007518939 A | 7/2007 |
| WO | 2006032438 | 3/2006 |
| WO | 2012000504 A1 | 1/2012 |
| WO | 2014071947 A1 | 5/2014 |

OTHER PUBLICATIONS

International Search Report and Written Opinion for PCT/EP2017/001357 dated Feb. 27, 2018.
International Search Report and Written Opinion for PCT/EP2016/001926 dated Jun. 16, 2017.
International Preliminary Report on Patentability for PCT/EP2016/001926 dated May 22, 2018.

* cited by examiner

Figure 4A:
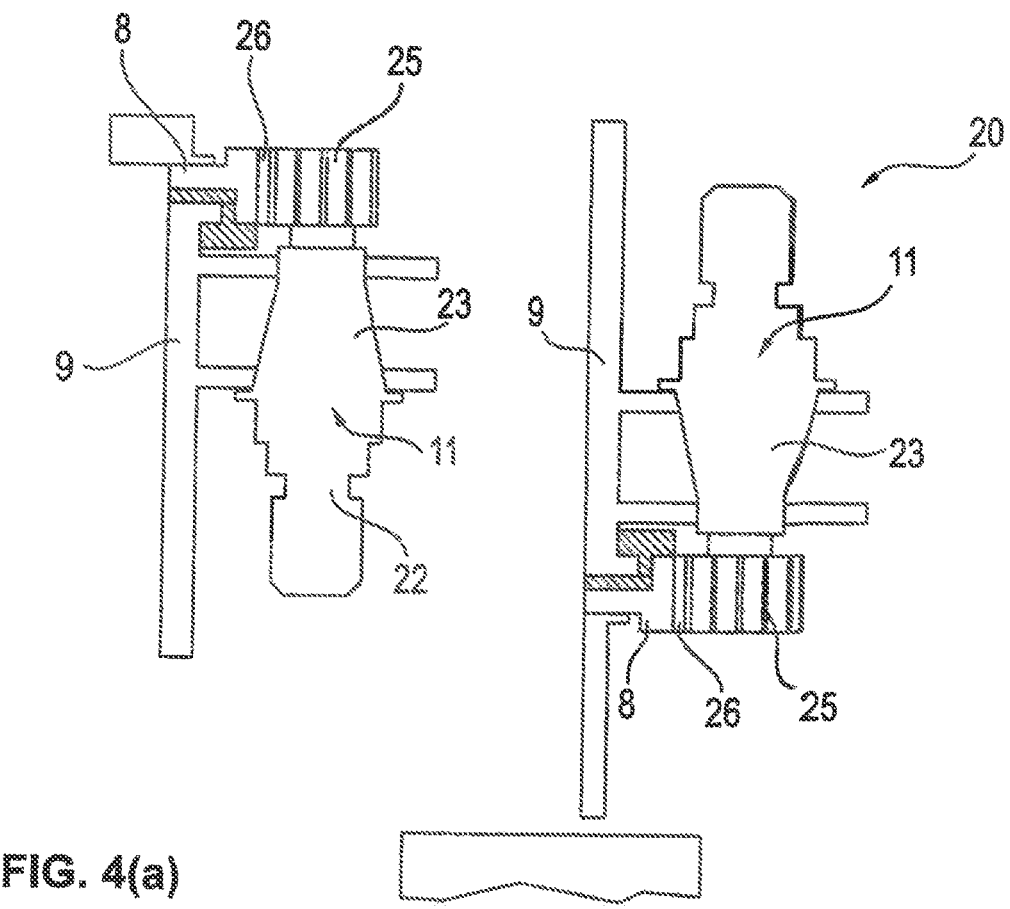
Figure 4B:
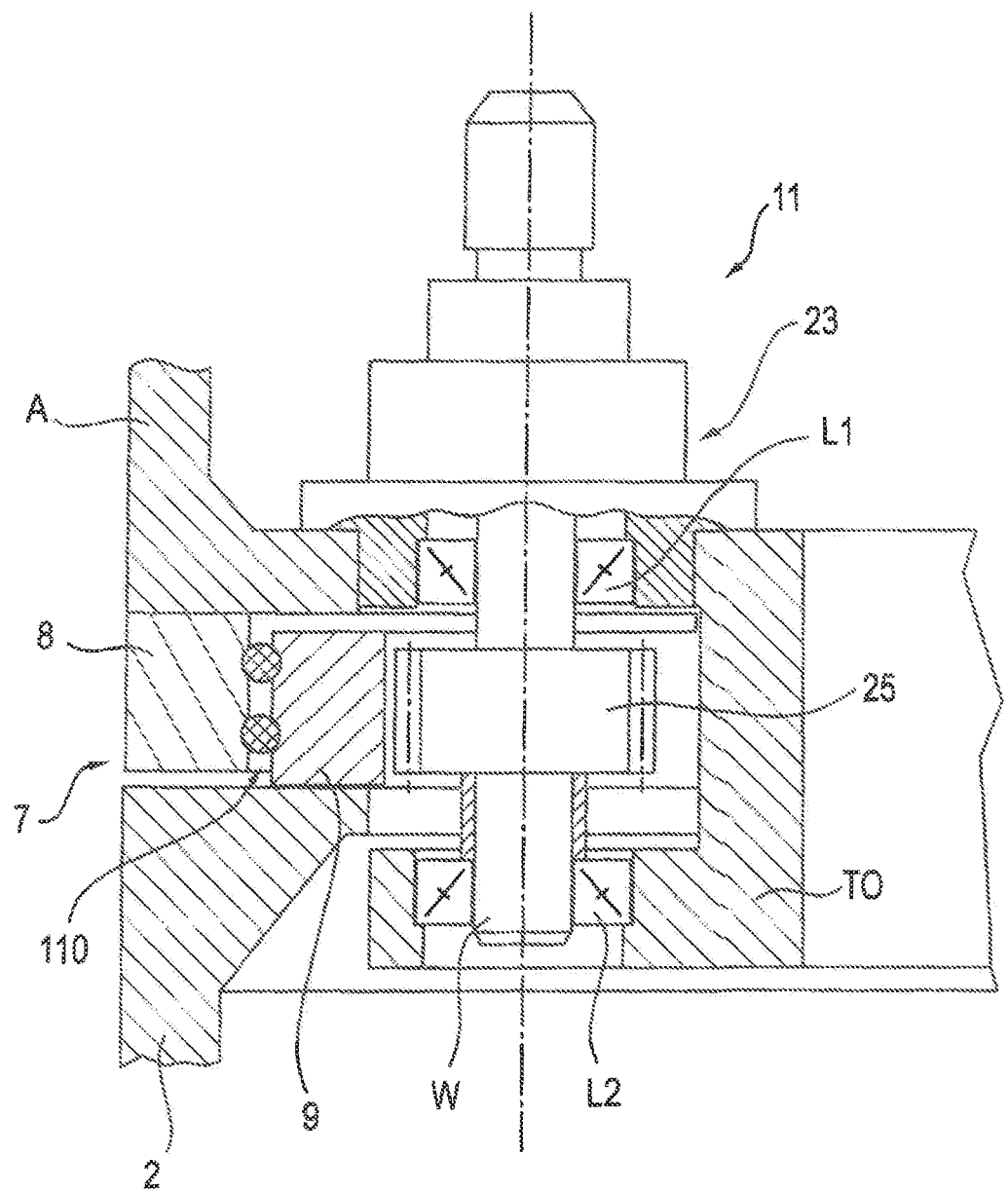
Figure 4D:
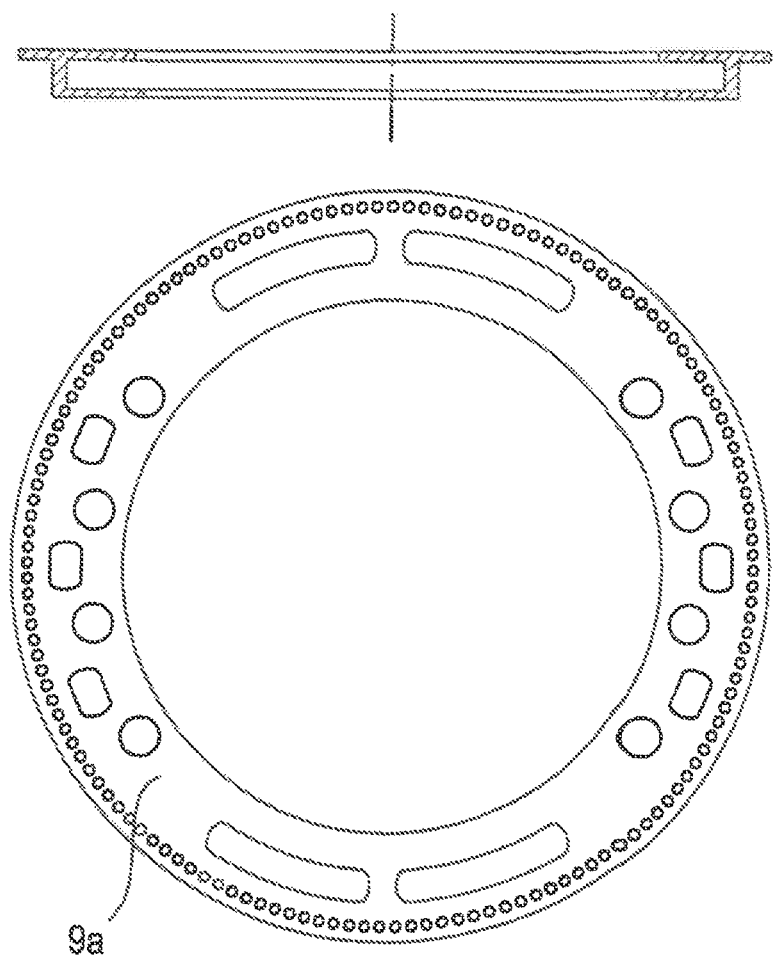
Figure 4G:
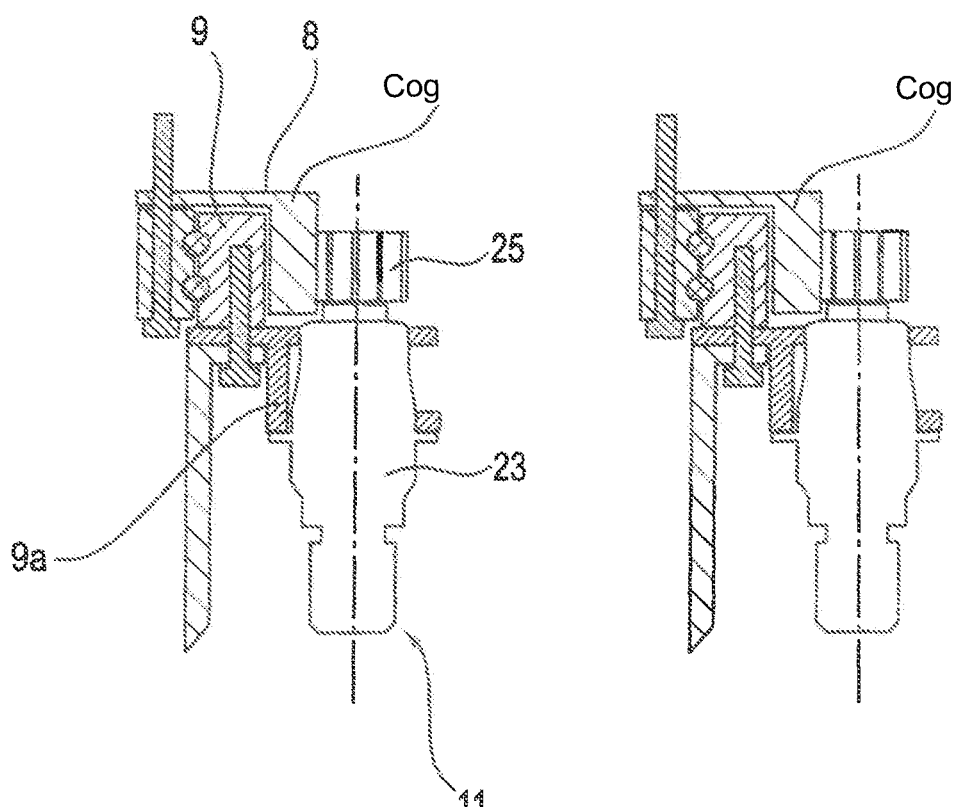
Figure 4H:
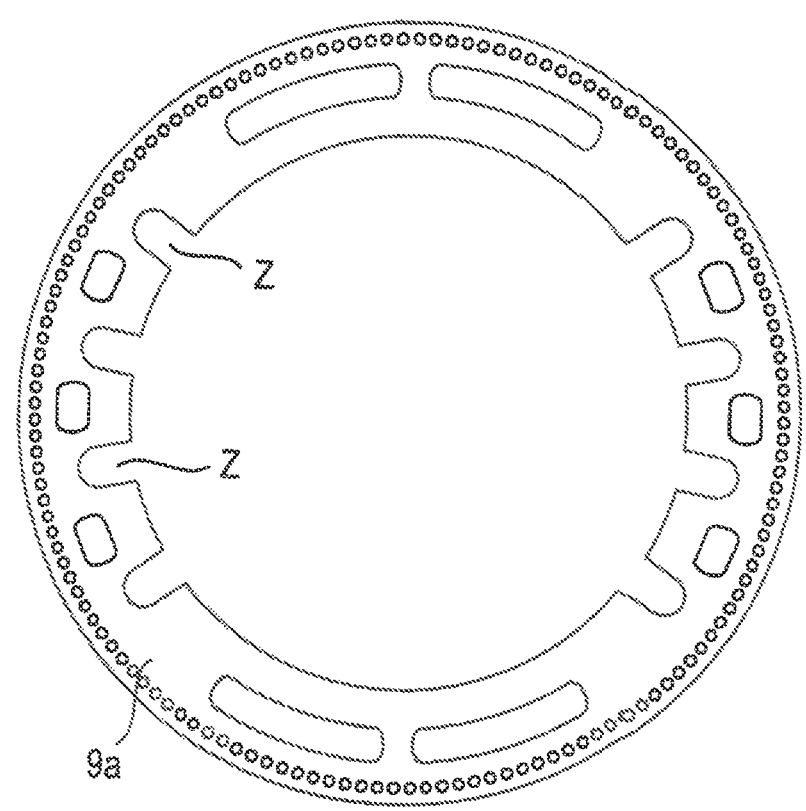

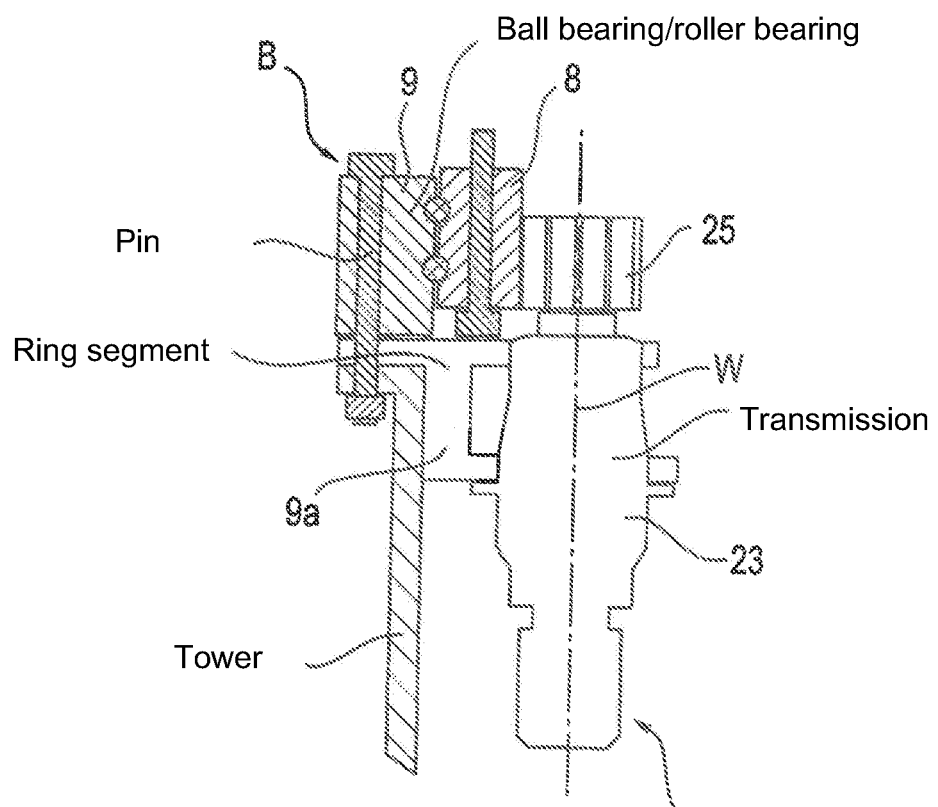
FIG. 4(c)
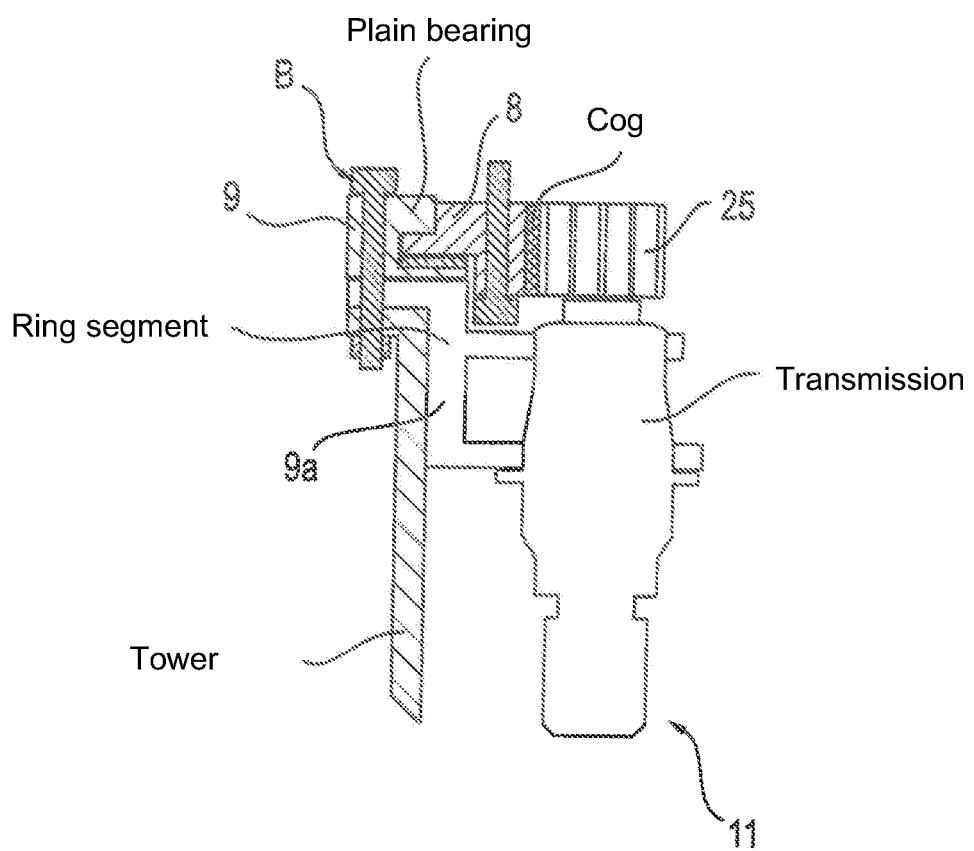

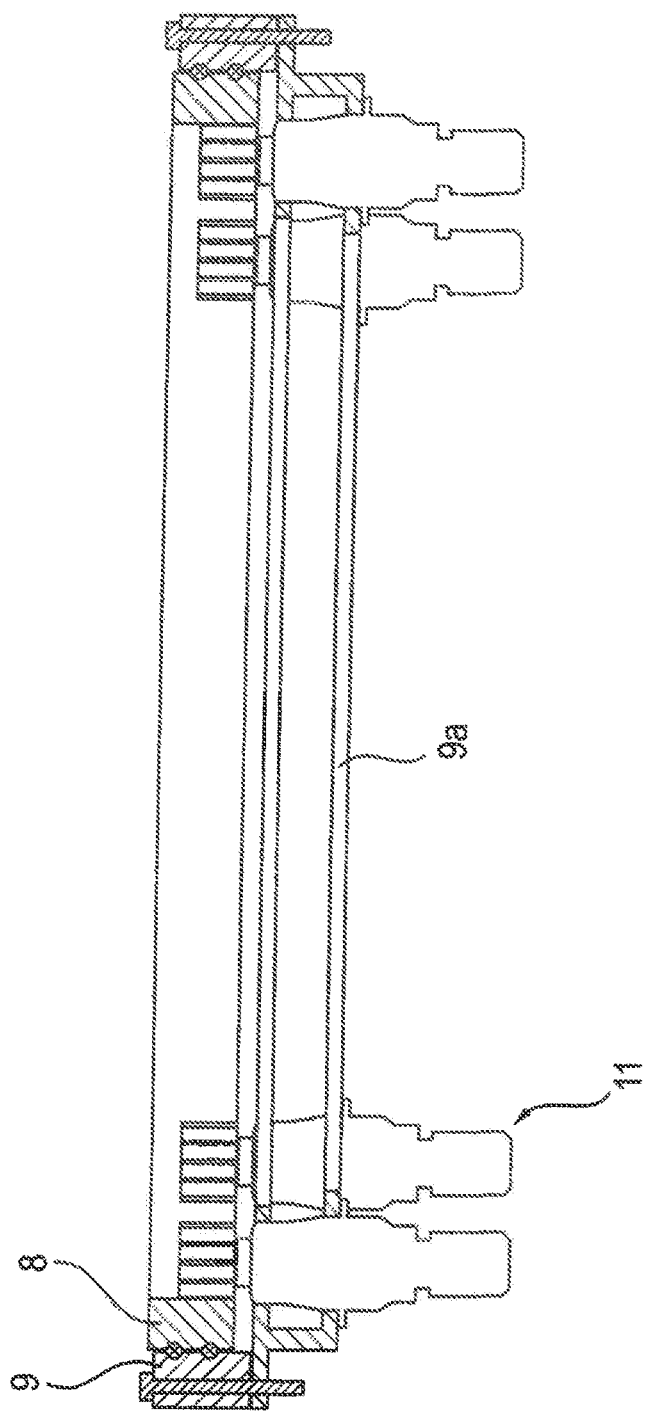

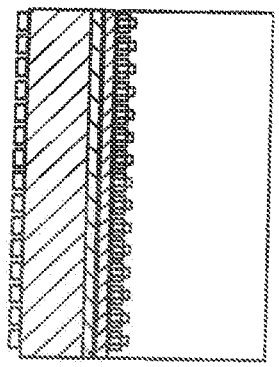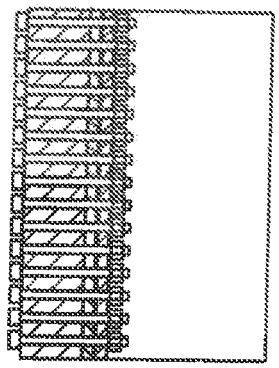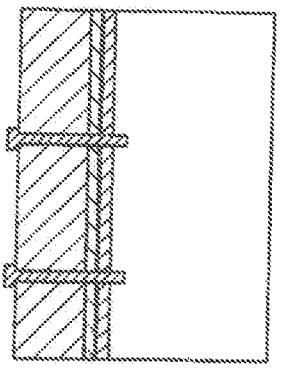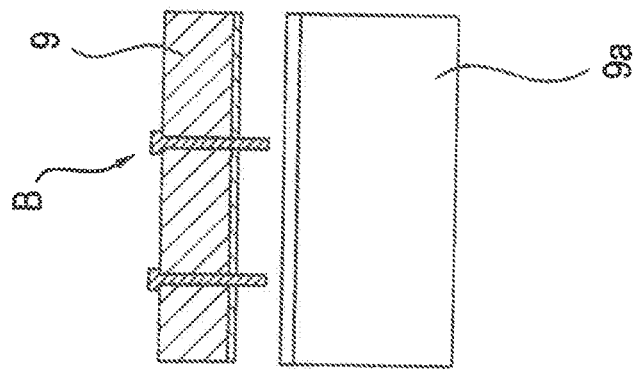
FIG. 4(f)

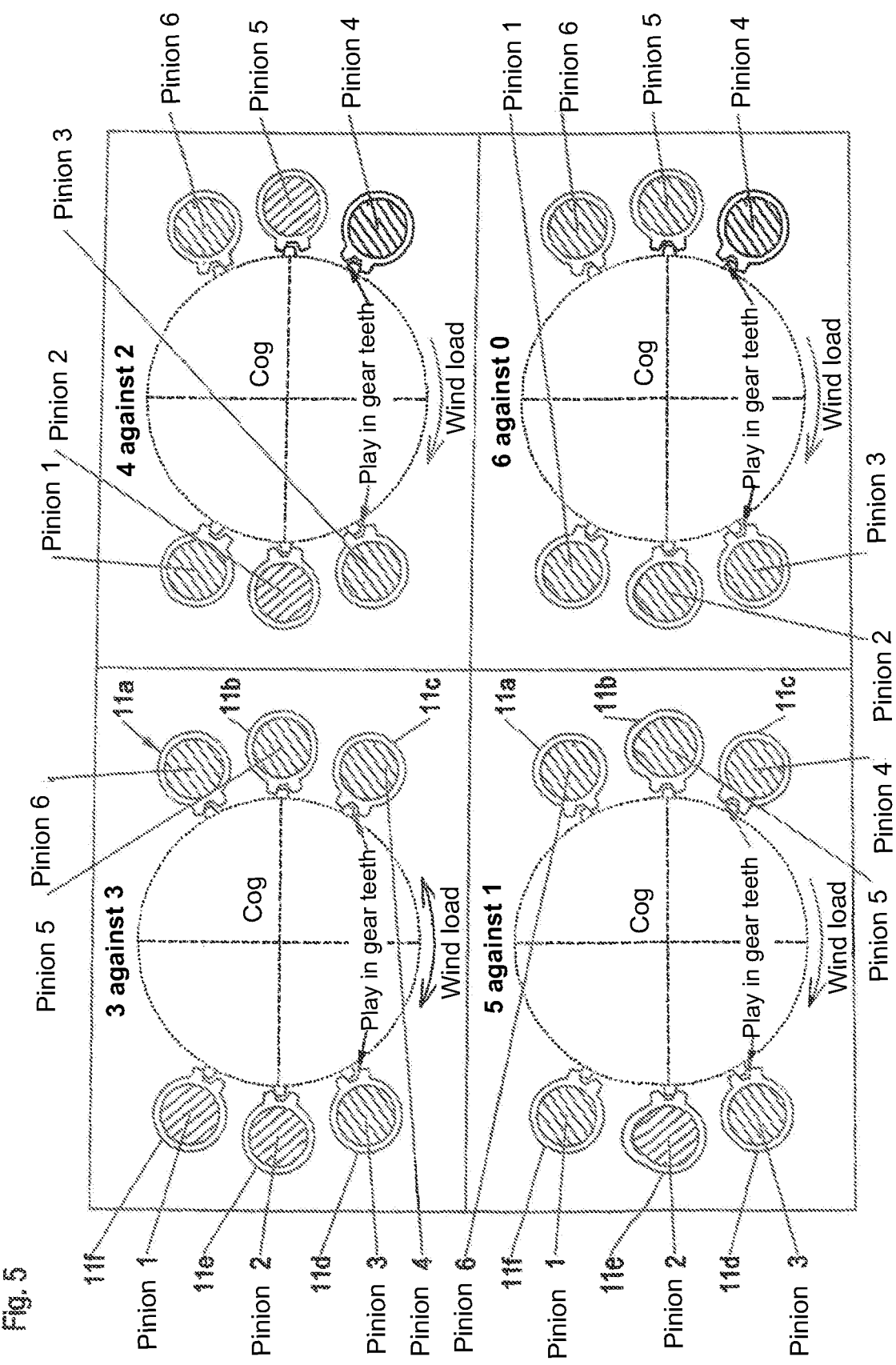

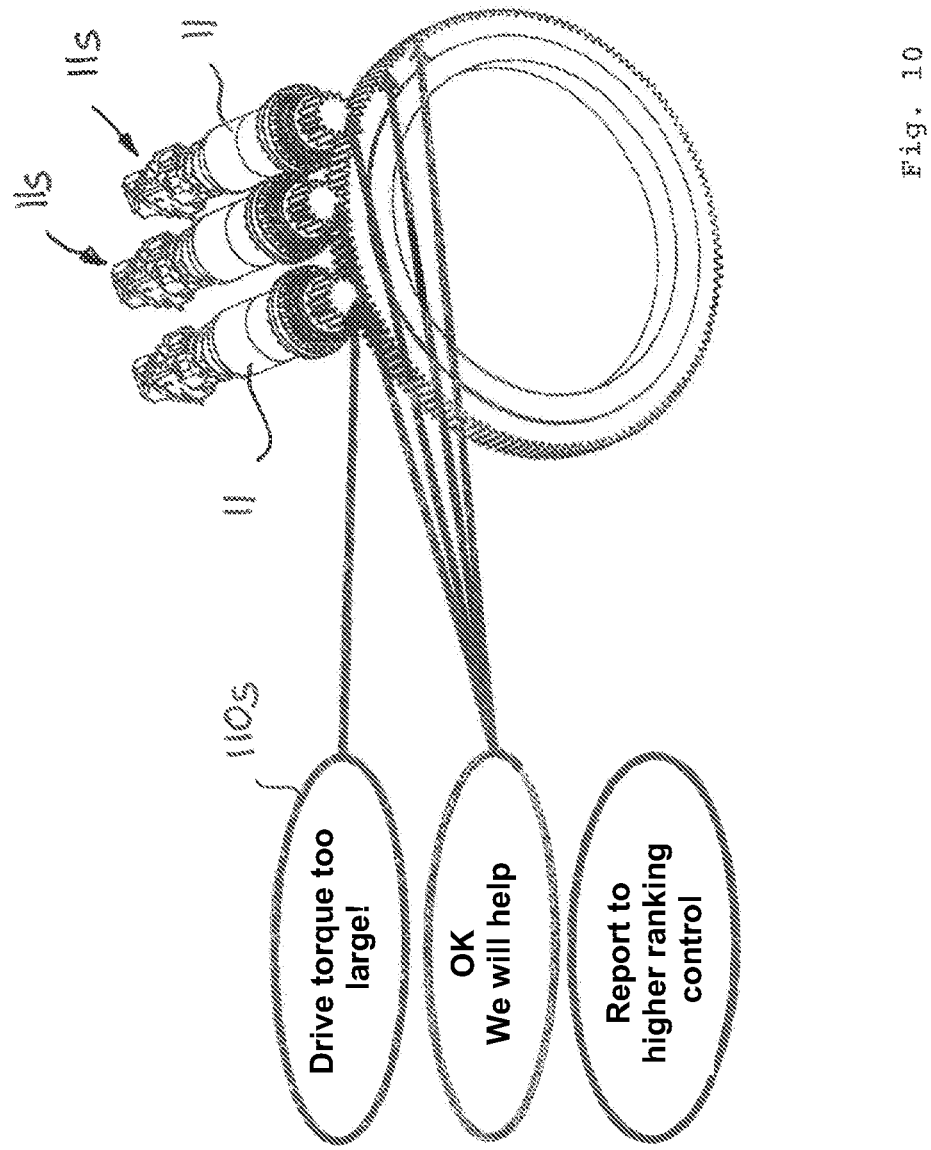

ADJUSTMENT AND/OR DRIVE UNIT, WIND TURBINE HAVING SAME, AND METHOD FOR CONTROLLING SAME

The invention relates to adjustment and/or drive units that can be used in wind turbines to set the azimuth angle of the wind turbine nacelle or the pitch angle of the rotor blades, or in other large slewing gears such as the slewing gear of a crane or of an excavator, wherein such an adjustment and/or drive unit has at least two actuating drives for rotating two assemblies, which are mounted for rotation relative to each other, and has a control device for controlling the actuating drives, which control device controls the actuating drives in such a way that the actuating drives are braced in relation to each other during the rotation of the two assemblies and/or at a standstill of the assemblies. The invention further relates to a wind turbine having such an adjustment and/or drive unit and to a method for controlling such an adjustment and/or drive unit.

In large rotary drives that are subject to large external loads such as is the case with azimuth adjustment drives of wind turbines or with the slewing gear of a derrick crane, a plurality of actuating drives are typically used that together adjust the two assemblies to be rotated. The actuating drives can here comprise a motor, for example in the form of an electric motor, that drives a drive gear such as a pinion via a transmission, for example a planetary transmission, said pinion engaging into a cog to rotate the cog. The assemblies to be adjusted can, for example, be the two bearing races of a large roller bearing and/or of a large plain bearing by means of which the nacelle or a tower piece bearing the nacelle is rotatably mounted about an upright axis at the tower of the wind turbine or the slewing platform of a derrick crane is mounted on its crawler track. The nacelle can then be rotated with respect to the tower or the slewing platform can be rotated with respect to the undercarriage by rotating the two bearing races.

Movements in the drivetrains result here due to play in the gear teeth so that the nacelle or the slewing platform can react with an unwanted dynamism, for example in the form of rotational vibrations, despite the use of a plurality of actuating drives. Said movements and elasticities in the drivetrain can have a variety of causes here, for example—in addition to tooth play in the tooth engagement between the pinion and the cog—also flexibilities in the transmissions used or flexibilities in the mounting of the actuating drives that are typically fastened to corresponding machine carriers that only have a limited stiffness.

In order not to have dynamic effects that are too large in the nacelle adjustment of wind turbines due to such movements, it has previously been customary to use a hydraulic service brake, for example, and to travel the adjustment of the assemblies with respect to one another against a certain braking force, i.e. the service brake is applied on the adjustment and provides a certain braking force that is overcome by the actuating drives. Unwanted dynamic fluctuations due to elasticities in the drivetrain can hereby be monitored and suppressed. It is, however, disadvantageous here that increased wear can occur at the drives, that the actuating drives themselves have to be over dimensioned so as not only to be able to apply the adjustment forces per se, but also to be able to overcome the braking force, and furthermore that the service brake itself has to be correspondingly configured and construction space has to be provided for it. At the same time, the service brake is subject to high wear and to a high service effort.

It has, on the other hand, also already been proposed to dispense with such a service brake or to carry out the adjustment movement without the braking force of a service brake and instead to brace the actuating drives in relation to each other. The document DE 10 2008 013 864 B4, for example, shows such a bracing of the actuating drives of the azimuth adjustment device of a wind turbine. It is proposed therein to divide the required total drive torque in the main axle over the plurality of actuating drives, with at least one of the actuating drives acting against the desired direction of rotation with a small counter-torque to implement a bracing of the actuating drives in relation to each other. For this purpose, different desired speeds are specified for the actuating drives with a speed difference in the range of 20 to 100 revolutions per minute to generate an opposed torque that should amount to an order of magnitude of 5 to 10% of the drive torque of the other actuating drives.

An azimuth adjustment system for the nacelle of a wind turbine is further known from EP 2 290 230 B1 that works with a plurality of actuating drives with which a respective separate controller is associated that communicate with one another and with a higher-ranking control controller. In this respect, in a first operating mode, all the actuating drives should work in the same direction of rotation to rotate the nacelle into the wind, while the actuating drives are braced in relation to each other in a second operating mode in which the nacelle should be secured at a rotary standstill.

Further actuating systems for nacelles of wind turbines are known from the documents DE 10 2007 049 386 A1, DE 10 2013 207 322 and US 2007/0158926 A1.

The unwanted dynamic effects due to play in the drivetrain can admittedly be reduced to a certain degree by such a braced operation of the plurality of actuating drives. Under unfavorable conditions such as high changing loads, for example, a buildup or an insufficient suppression of the dynamic effects can, however, nevertheless occur. On the other hand, the actuating drives and the drivetrain are unnecessarily loaded in calm phases, e.g. low-wind phases, in which per se no greater damping of dynamic effects would be necessary.

On the other hand, overloads can occur with such actuating drive systems that can result in damage to individual actuating drives or in a destruction of components. Since the individual actuating drives cannot be configured such that they transmit the total force respectively individually with a turbine having a plurality of actuating drives that operate in a force-locked manner, overload of a drive can occur in the event of asymmetrical loads. If every drive were individually configured such that it can alone transmit the total maximum load, the turbine as a whole would be dramatically over dimensioned. The actuating drives are therefore as a rule configured such that together they apply the actuating forces and the actuating torques and forces required overall are distributed.

With the aforesaid possible overloads, destruction can occur in part at components that are difficult to replace, with the greatest damage arising in that that region is destroyed into which all the drives introduce their forces since then an emergency operation by means of some actuating drives is then also no longer possible. With a cog drive of the aforesaid kind such as is used in azimuth modules of wind turbines or in large slewing gears, for example of cranes, a destruction of the cog or of the tooth flanks of such a cog immobilizes the total turbine, with very long standstill times occurring since the dismantling of the cog is not easily possible.

To avoid such greater damage and such longer standstill times, it has already been proposed to install predetermined breaking points in less critical components to protect the more critical components from destruction and to be able to more easily replace the component destroyed at the predetermined breaking point. Document EP 2 280 191 B1, for example, shows an actuating drive of the named kind in which the large cog should be protected from destruction in that the output shafts of the actuating drives have a predetermined breaking point, for example in the form of a corresponding notch directly in the output shaft or in a shaft flange connected thereto. Said output shaft is here seated between a pinion that meshes with the cog and a transmission via which said output shaft is driven by an electric motor.

Such mechanical predetermined breaking points at the output shaft of the actuating drives admittedly protect the cog and also the transmissions of the actuating drives from destruction or damage and only a comparatively simpler, cheaper component has to be replaced. There are nevertheless standstill times for the repair and there is a corresponding yield loss.

Starting from this, it is the underlying object of the present invention to provide an improved adjustment and/or drive unit, an improved method for controlling such an adjustment and/or drive unit and an improved wind turbine having such an adjustment and/or drive unit, to avoid the disadvantages of the prior art, and to further develop the latter in an advantageous manner. A reliable overload protection should in particular be achieved that avoids or at least shortens standstill times of the adjustment and/or drive unit and of the turbine equipped therewith. In this respect, an improved compensation of the movement in the drivetrain should preferably simultaneously be achieved that reliably suppresses unwanted dynamic effects on the adjustment of the angular position even under unfavorable conditions, with simultaneously the load and the wear of the actuating drives and of the drivetrain being reduced and a solution with fewer actuating drives being made possible.

In accordance with the invention, said object is achieved by adjustment and/or drive units in accordance with claim 1, by a wind turbine in accordance with claim 44, and by a method for controlling such an adjustment and/or drive unit in accordance with claim 45. Preferred embodiments of the invention are the subject of the dependent claims.

It is therefore proposed to configure the actuating drives themselves as intelligent and to have them communicate directly with one another to avoid overloads of individual actuating drives fast and without delay. The load signals that reflect the individually detected loads of the actuating drives are transmitted, at least when they indicate the reaching of an overload of an actuating drive, to at least one other actuating drive or to all the other actuating drives and are there converted by a decentralized control module of the receiving actuating drive into an auxiliary torque. If an actuating drive reports an overload or at least the approach to the overload to the other actuating drives, at least one of the other actuating drives changes its provided torque by said auxiliary torque so that the actuating drive seeking help is relieved. No intervention of the central higher-ranking control device and also no query is necessary there to provide the auxiliary torque. Delays such as can occur on the control from a central higher-ranking control device and on the communication therewith can be avoided by the direction communication of the decentralized control modules of the actuating drives with one another so that voltage peaks that occur and that would result in an overload state can be particularly efficiently intercepted.

The decentralized control modules of the actuating drives are in particular configured here to also provide said auxiliary torque while at least temporarily disregarding the desired torque that is specified by the central higher-ranking control device.

Said auxiliary torque can here be an increase of the torque provided by the actuating drive when the actuating drive has the same working direction as the actuating drive seeking help. Alternatively, the auxiliary torque can also be a reduction of the torque of the actuating drive when said actuating drive works in the opposite direction, i.e. in the bracing direction, to the actuating drive seeking help.

Said auxiliary torque is here advantageously variably adapted in amount to the load signal of the actuating drive seeking help. If the actuating drive seeking help requires greater support, another actuating drive can provide a greater auxiliary torque. If the actuating drive seeking help only requires smaller support, the auxiliary torque can be selected as smaller.

In this respect, auxiliary torques can also be provided by a plurality of actuating drives, in particular when a single different actuating drive cannot alone provide the required auxiliary torque.

Each decentralized control module of a respective actuating drive can advantageously have an evaluation device to at least be able to evaluate the load signal of its own load determination device, but optionally also to be able to evaluate the load signals of other actuating drives. Said evaluation devices are here advantageously configured such that a load signal or an auxiliary signal derived therefrom is only forwarded or sent to other actuating drives when the evaluation of the load signal actually indicates the reaching of an overload. The data traffic between the actuating drives can hereby be reduced or kept small. The evaluation devices can in particular be configured such that they continuously or cyclically evaluate the load signal of their own load determination devices and on the reaching of a critical load state convert it into an auxiliary signal that is then sent to at least one of the other actuating drives. In general, however, it would also be possible to work with only one evaluation device that then evaluates the load signals of all the actuating drives.

In addition to the direct communication of the actuating drives between one another, the load signals of the load determination devices can advantageously also be communicated to the higher-ranking central control device, with said central higher-ranking control device advantageously being configured to adapt the specification of the desired torques to the individual actuating drives in dependence on the received load signals.

Said report to the higher-ranking control advantageously only takes place when the provision of the auxiliary torques or the corresponding regulation for avoiding overloads of individual actuating drives that so-to-say was directly provided internally between the actuating drives has already taken place.

The control modules of the intelligent actuating drives are therefore used to form an intelligent overload protection by means of which overloads of individual actuating drives and damage or even destruction possibly resulting therefrom can be avoided. In accordance with an aspect of the present invention, an overload protection device is therefore provided that monitors the load states of the individual actuating drives and variably distributes the drive torques to the plurality of actuating drives so that on an impending overload, the drive torque at an actuating drive is capped or is reduced and at least one further actuating drive intervenes in a control engineering and supporting manner to nevertheless provide the total desired drive torque where possible.

If it is found that the force or the torque or the load becomes too large or threatens to become too large at a drive or at a plurality of drives, the control modules of the further drives react such that the further drives have a greater supporting effect and behave such that all the actuating drives are operated within their permitted ranges.

Said overload device can advantageously be configured such that the distribution of the drive torques provided per se is observed where possible—as much as possible—and the special distribution of the drive torques provided for overload protection reasons is restricted to keep the support by the other actuating drives as small as possible to actually not allow the respective actuating drive facing an overload to change into the overload or at least not into a critical overload. The drive torque provided as support—either the increase of a drive torque acting in a supporting manner or the reduction of a counteracting bracing drive torque—is therefore sparingly used by the control device and is in particular only provided at a level that is necessary to protect the other actuating drives from overload. The previously explained desired operating characteristic of the adjustment and/or drive device, in particular the explained bracing, can hereby be largely maintained. However, this desired normal behavior—in particular said bracing—of the total adjustment and/or drive unit can be overwritten where necessary by the monitoring device.

If the overload protection device intervenes in the said manner, this can be reported in an advantageous further development of the invention to a higher-ranking control, for example to be able to reconstruct it at any time via a remote monitoring. Said overload protection apparatus can for this purpose output an overload protection report or can provide it to an interface from where it can then be invoked by the higher-ranking control and/or remote monitoring device.

Said load determination devices that individually determine the respective load acting on the individual actuating drives can generally be configured in different manners. In a further development of the invention, said load determination devices can each have a sensor element by means of which, for example, a load can be measured that acts on the output shaft of the actuating drives. Such a sensor element can in particular comprise a force and/or torque and/or strain and/or torsion measuring element that can be associated with said output shaft of the actuating drives. The previously explained sensor elements and/or load detectors can generally be used by means of which the torque distribution can also be controlled for the purpose of bracing so that reference is made in this respect to the preceding description.

Depending on the required support and/or on the current operating status of the torque distribution, the overload protection device can take various measures for support. For example, the number of the actuating drives working in the desired direction of rotation and/or the number of the actuating drives working in the opposite, bracing adjustment direction can be changed to support an actuating drive moving to overload. If, for example, four actuating drives work in the desired direction of rotation and two actuating drives work in the opposite, bracing adjustment direction, one or both of the actuating drives working in the opposite, bracing direction of rotation can, for example, be switched off or switch to idling if one or more of the actuating drives working in the desired direction of rotation threatens to move into overload. One or both of the oppositely working, bracing actuating drives can optionally also be switched over to no longer act oppositely in a bracing manner, but likewise to work in a desired direction of rotation.

Alternatively or additionally to such a change of the number of the actuating drives working in the respective direction, the drive torque distribution can also be changed within an actuating drive group working in the same direction to protect or to relieve an actuating drive moving into overload. If, for example, three actuating drives work in the aforesaid manner in the desired direction of rotation and two further actuating drives work in the opposite, bracing direction of rotation, one or two of the actuating drives working in the desired direction of rotation can, for example, be controlled such that they provide more drive torque when the third of said actuating drives working in the desired direction of rotation threatens to move into overload.

The control device can advantageously be constituted such that first an attempt is made to maintain a desired bracing state, i.e. the ratio of the drive torques that work in the desired direction of rotation and in the opposite direction of rotation, and/or to first leave the degree of the bracing, that is, the absolute level of the oppositely working drive torques—respectively viewed in sum—unchanged or to control it in the previously explained manner in dependence on the external loads and, where possible, to avoid overload states of individual actuating drives in that the drive torques are distributed variably within the actuating drives working in the same direction to avoid overloads of individual actuating drives and only to change said ratio of the oppositely working drive torques and/or their absolute levels when the aforesaid first stage, i.e. change of the drive torque distribution within a group, is no longer sufficient to achieve a reliable overload protection.

The distribution and change of the drive torques at the individual actuating drives, that is, on the one hand a capping and/or reduction of the drive torque at the actuating drive that threatens to move into overload and an increase or decrease of the drive torque acting in a supporting or bracing manner at least one other actuating drive can generally be effected in different manners from a control engineering aspect. The overload device can for this purpose in particular use the previously already explained strategy, that is, for example, by a variable changing of the spread of the desired speed and/or a changing of the motor characteristics of the actuating drives and/or individual desired speed specification by a speed regulator and/or changing of the motor characteristics in dependence on a desired speed specified by a higher-ranking speed regulator.

Said overload protection device can provide further measure to prevent the negative consequences of overloads as required when the control engineering overload protection is no longer sufficient. The overload protection device can in particular provide or comprise overload brakes that can be actuated in individual actuating drives or in all actuating drives when the load determination device reports an impending overload at one or more actuating drives. Further damage can in particular be prevented on a mechanical blocking of an actuating drive by actuating the overload brakes.

Alternatively or additionally to such an overload protection brake that can advantageously be actuated in dependence on the signal of the load determination devices, it is also possible to provide a predetermined breaking point in the actuating drive, advantageously in the region of the output shaft that connects the output gear that is in engagement with the components to be rotated to a transmission via which the motor drives the output shaft.

It is further advantageously proposed to adapt the bracing of the actuating drives in relation to one another to external loads on the traveling of the assemblies to be adjusted in order to not unnecessarily load the actuating drives, but on the other hand to also achieve sufficient bracing and thus damping of the dynamic effects under unfavorable conditions. In this respect, the control device comprises a bracing setting device for a variable setting of the level of the bracing of the actuating drives in dependence on a variable external load on the assemblies to be adjusted that can be determined by means of a load determination device. If a high bracing is required due to the external loads, the bracing setting device provides a higher or sufficiently high bracing, while a smaller bracing can be provided if the conditions permit it to not unnecessarily load the actuating drives. Smaller dimensioned and/or fewer actuating drives can be used and premature wear can be avoided by such an intelligent adaptation of the bracing of the actuating drives to the external loads to the assemblies to be adjusted, in particular the nacelle to be rotated and the rotor fastened thereto or to the slewing gear of a crane, whereas a minimization of unwanted dynamic effects can nevertheless also be ensured under unfavorable conditions. The servicing effort is reduced in this process.

The bracing setting device can in particular be configured such that the bracing of the actuating drives is increased as the external load increases and/or as the load fluctuations increase, whereas a smaller bracing of the actuating drives can be set as the external loads decrease and/or with only smaller fluctuations or no fluctuations of the external load.

A stepwise adjustment of the bracing can generally be sufficient in this process, in particular when a sufficient number of stages, for example three or more stages, in particular also five or more stages, are provided, but with only two stages also being able to be sufficient. This can simplify the control of the actuating drives and avoid excessive calculation operations of the control or regulation device. Alternatively, however, a continuous adjustment of the bracing can be provided to achieve an adaptation of the bracing to the external boundary conditions that is as fine as possible.

The external loads can generally be determined or considered in different manners, with the load determination being able to take place directly or indirectly.

In an advantageous further development of the invention, a wind detection device can be provided that detects the wind strength and/or the wind direction and/or the uniformity of the wind field so that the bracing can be variably adapted in dependence on the detected wind strength and/or on the wind direction and/or on the wind strength fluctuations and/or wind direction fluctuations. The bracing setting device can in particular be configured to increase the bracing of the actuating drives as the wind strength increases and/or as the unevenness of the wind field increases due to squalls and/or wind shifts. Provision can, for example, be made that at lower wind strengths up to a certain limit value, for example less than 10 m/sec. or less than 5 m/sec., a smaller bracing of, for example, in the range of 20 Nm is provided, whereas at higher wind strengths above a predetermined wind limit of, for example, more than 10 m/sec., a higher bracing is provided, for example in the range of 30 Nm or more. Instead of a range-wise setting with wind strength limits, a multi-stage adjustment or a continuous adjustment can also be provided here, optionally while using a damping member so as not to have to carry out an adaptation of the control at every very small wind strength change.

Alternatively or additionally to the taking account of wind strength, the wind direction and/or the irregularity of the wind field can be taken into account, for example such that with wind directions oscillating to and fro and/or with greater fluctuations in the wind field that alternately load different actuating drives more, a symmetrical bracing is set at which the same number of actuating drives are operated at a torque in the desired direction of rotation s actuating drives at a torque against the desired direction of rotation. If the wind therefore oscillates to and fro or if the wind field is generally irregular, so that overall a greatly fluctuating load on now the one actuating drive group, and now on the other actuating drive group results, the bracing setting device can provide that, for example, two actuating drives are braced against two actuating drives or three actuating drives are braced against three actuating drives, i.e. two actuating drives drive the adjustment movement onward, while the two further actuating drives brake the adjustment movement or—with the said three against three setting—three actuating drives drive the adjustment movement onward, while three actuating drives act against it. The actuating drives can correspondingly also be braced at a standstill of the rotational unit, for example two against two or three against three or in different constellations.

If, on the one hand, the wind direction has the result that the actuating drives are loaded at one side or asymmetrically, the bracing setting device can provide an asymmetrical bracing in which more actuating drives drive the adjustment movement onward than actuating drives brake the adjustment movement or, vice versa fewer actuating drives drive the adjustment onward than actuating drives brake this adjustment movement depending on the direction in which the external load asymmetrically loads the plurality of actuating drives. Such an asymmetrical bracing can also be correspondingly provided at a standstill.

Such a symmetrical or asymmetrical bracing of the actuating drives with the same number or with a different number of actuating drives working in opposite directions can here alternatively or additionally also be set by the bracing setting device to take account of the wind conditions based on other parameters or indicators of the load. For example, the bracing setting device can evaluate the actually occurring load on the actuating drives, for example by evaluating their power consumption, to determine whether an overall symmetrical load or an asymmetrical load is present, whereupon then a symmetrical or asymmetrical bracing can be set in said manner.

The load determination device can—alternatively or additionally to a direct wind detection and/or wind field detection—in particular determine the load development and/or torque development arising at the actuating drives to variably set the level and the distribution of the bracing of the actuating drives in relation to one another in dependence thereon. The load determination device can advantageously comprise a load amplitude determiner to determine the load amplitudes occurring at at least one actuating drive, with the bracing setting device being able to be configured to provide an increasingly greater bracing with increasingly greater load amplitudes. This approach starts from the consideration that with more greatly fluctuating wind loads and/or with an increasingly more irregular wind field, the loads induced at the actuating drives fluctuate more and/or the induced load amplitudes become increasingly larger.

Said load amplitude determiner can advantageously be provided to determine the load amplitudes from an unfiltered load signal, for example maximum and minimum values over a predetermined, preferably short time range of, for example, some few seconds and to determine the load amplitude from said maximum and minimum values occurring in a specific time interval.

The load signal used by the load determination device to determine the loads at the actuating drives can generally be acquired in different manners. For example, the torque occurring at the actuating drive and/or at an associated transmission and/or at a drivetrain element can be measured by means of a torque measuring device, with the unfiltered amplitudes of the torque signal being able to be evaluated. Alternatively or additionally, strains or deformations that occur at a component of the actuating drive and/or of the drivetrain can be determined by means of a strain measuring device, for example a strain gauge, to determine the amplitudes in said manner from the strain signal. Again alternatively or additionally, a reaction force, for example with respect to a bearing element of the actuating drive or to a drivetrain element, can also be measured by means of a force sensor or a force measuring device to therefrom determine the load amplitudes that are induced by fluctuating wind loads.

Alternatively or additionally, the loads of the actuating drives and/or the loads acting on the actuating drives can also be measured by sensor elements that are associated with an output shaft of the actuating drives, with the sensor element being able, depending on the configuration, to be directly attached to the output shaft or connected to a component that is connected to said output shaft or supports it. A torsion gauge can, for example, be attached to the output shaft and measures a torsion of the output shaft. Alternatively or additionally, a strain gauge can detect a deformation of the output shaft or of a component connected thereto. Alternatively or additionally, force gauges and/or torque gauges can detect forces and/or torques present at the output shaft or at components connected thereto such as shaft flanges or bearing flanges.

Said output shaft of the respective actuating drive with which the sensor element is associated can advantageously extend between the drive gear, in particular a pinion, that is in engagement with one of the components to be rotated and a transmission via which the output shaft is driven by a drive such as an electric motor or a hydraulic motor. The arrangement of the sensor element at said output shaft can provide an exact determination of the actual load, in particular at the components of the system that are at risk. The tooth flank loads can in particular hereby be very exactly estimated that occur at a cog as a result of the measured loads at the output shaft.

The load determining device is advantageously configured such that the loads individually occurring at each actuating drive can be singly or individually determined.

Alternatively or additionally to the measurement of such mechanical values, the load torque and/or the drive loads can also be determined from electrical parameters of the actuating drives. For example, the load amplitudes can be calculated from power consumption fluctuations and/or voltage fluctuations and/or from parameters occurring at the frequency inverter.

To determine asymmetrical loads on the adjustment and/or drive unit or the degree of asymmetry of the loads acting on the adjustment and/or drive unit, the load determining device can also be configured to determine a mean torque of the actuating drives, with the mean value or the value averaged over a time window of the torques provided by the actuating drives being able to be considered as the mean torque. If it is, for example, determined that the actuating drives, considered overall, have to provide a torque of a specific value rotating in a specific direction of rotation to travel to or to maintain a predetermined angle of rotation, it can be assumed that an asymmetrical load acts on the wind turbine or an asymmetrical load acts on the assembly to be adjusted. Depending on the amount and/or the time duration of the determined mean torque, the bracing setting device can variably set the bracing such that the number of actuating drives rotating in one direction is increased and/or the number of actuating drives rotating in the opposite direction is lowered. If, for example, a torque increasingly pulling to the left constantly or over a longer time period—or with fluctuating loads, a torque that primarily pulls to the left—is measured, the number of the actuating drives rotating to the right can be increased and/or the number of the actuating drives rotating to the left can be decreased. Alternatively or additionally, the bracing can also be displaced in the one or the other direction of rotation in that, for example, the torque of the actuating drives rotating in the one direction is increased and/or the torque of the actuating drives rotating in the other direction is decreased.

Said determination of asymmetrical loads on the adjustment and/or drive unit, for example by the aforesaid determination of the mean torque of the actuating drives, can also be used to determine the wind direction, which can be more exact than a direct measurement of the wind direction by a wind gauge and can be used to exactly travel the nacelle or the rotor of the wind turbine into the wind. For example, the control apparatus can readjust the set angle to be traveled to for so long until asymmetrical loads are no longer determined, or the asymmetry of the external loads becomes minimal.

To also be able to precisely determine the external loads and/or the torques or loads induced at the actuating drives at a standstill, generally different procedures can be followed. For example, the torque can be calculated by means of the frequency inverter while the corresponding actuating drive is in operation. Alternatively or additionally, when the motor is switched off and a standstill brake is closed, the torque can be measured via the previously already mentioned torque measuring device and/or load measuring device, for example in the form of a measuring flange and/or of strain gauges at a stationary structural part of the drive and/or of the brake, for example via a strain gauge at the motor or at the braking housing.

Alternatively or additionally to such a torque determination by a measuring flange or by strain gauges, the torque can also be determined by monitoring the angle of rotation at a drive gear or at an element of the drivetrain, in particular of the output pinion of an actuating drive. If the stiffness of the actuating drives is known, the change of the torque can be calculated with a stationary actuating drive, more precisely with a stationary motor and/or with a stationary brake from an angle change at the drive gear, in particular at the output pinion. A specific torque change is namely accompanied by a specific angular change. To be able to determine the absolute level of the torque, the drive torque of the actuating drive before the switching off can serve as the basis to be able to determine the change with respect to this basis via the angle of rotation measurement and thus always to be able to determine the absolute value of the torque.

Alternatively or additionally to the setting of the bracing, the load determined at a standstill can also be used to design the switching procedure between the brake and the motor, that is, from a braked standstill to an actuating movement, or conversely from motor operation to a braked standstill operation as smoothly as possible. For example, the load torque determined in the aforesaid manner can be observed so that a switch can be made at a time of very small load in order not to overload the transmission, even when the motor and the brake hold the rotor together for a brief time. Alternatively or additionally, the sum of the braking torque and the motor torque can be monitored and can be limited by the actuating drive control.

Alternatively or additionally, the bracing setting device for the setting of the bracing can take account of an angle of attack or of a pitch angle of at least one rotor blade. A pitch angle or blade angle detection device can be provided for this purpose in dependence on whose signal the bracing setting device can vary the bracing of the actuating drives. For example, the bracing setting device can provide that at pitch angles that are typically set at higher wind strengths and/or at higher turbine powers, a higher bracing is set than at pitch angles that are set at lower wind strengths and/or at lower turbine powers. This can start from the consideration that at corresponding pitch angles correspondingly higher or lower dynamic loads act on the nacelle that require a correspondingly higher or lower bracing or let it be sufficient. The bracing setting device can advantageously communicate directly with the pitch angle actuator system to take account of the pitch angle on the bracing of the actuating drives in relation to one another.

Alternatively or additionally, a turbine power that the wind turbine provides can also be considered for the setting of the bracing of the actuating drives. For example, a greater bracing can be set at higher turbine powers and a smaller bracing can be set at lower turbine powers. Such an approach starts from the consideration that greater dynamic forces generally pull on the nacelle at higher turbine powers and thus a greater bracing of the actuating drives is necessary on the traveling of the nacelle to a different azimuth angle to achieve a secure suppression of the unwanted dynamic effects.

The setting of the bracing can generally be effected in different manners by the bracing setting device. The bracing setting device can in particular advantageously be provided to change the number of actuating drives that work with a torque in a first direction of rotation and/or the number of actuating drives that are operated with a torque in the opposite direction of rotation to hereby set the bracing in the desired manner, in particular to vary the level of the bracing.

Alternatively or additionally, the bracing setting device can set the bracing of the actuating drives by a variable change of the spread of the desired speeds predefined for the actuating drives. For this purpose, the desired speed of at least one actuating drive can be lowered with respect to the desired speed which is to be carried out per se and at which the assembly is then correspondingly adjusted and/or the desired speed of at least one actuating drive can be raised with respect thereto.

Depending on the desired level of bracing, work can here be carried out at desired speed spreads of different amounts, with, for example, a desired speed difference between a braking actuating drive and a driving actuating drive in the range from 100 to 500 or 200 to 500 revolutions per minute being able to be sufficient and advantageous, but with higher speed differences of more than 500 revolutions per minute, in particular also 1000 to 5000 revolutions per minute also being able to be provided. For example, a reasonable or suitable bracing can be achieved at a desired speed for a number of travel movements that occur increased or decreased by approximately 3000 revolutions. On the other hand, speed differences of fewer than 100 revolutions per minute can also be considered.

In an advantageous manner, the bracing setting device can be configured to change the motor characteristics of the actuating drives to be able to set or adapt the bracing more smoothly or more exactly.

Provision can in particular be made in an advantageous further development of the invention that a speed regulator specific to the motor is associated with each of the plurality of actuating drives, said speed regulator specifying a torque for the respective associated actuating drive and receiving back the actual speed of the associated actuating drive. A higher-ranking speed regulator can be provided here that specifies a respective desired speed for the speed regulators specific to the motors.

This higher ranking speed regulator can advantageously take account of a plurality of input parameters, in particular a desired angle of rotation that specifies the desired adjustment of the assembly, for example the desired azimuth angle or the desired azimuth angle adjustment of the wind turbine nacelle and furthermore advantageously additionally a wind speed signal and/or a torque signal that reproduces the torque acting on the assembly on the basis of the external loads, for example the wind torque, and/or a load amplitude signal that reproduces the load amplitude at the actuating drives and/or a yet further parameter as explained above, for example the pitch angle. The higher-ranking speed regulator then specifies respective desired speeds for the speed regulators specific to the motors in dependence on said input parameters.

Said speed regulators specific to the motors can change the motor characteristic of the respective motor in dependence on the specified desired speed and/or on the difference from a desired speed and/or from the desired torque to be provided and/or the difference between the desired torque and the actual torque to set the motor as smoother, for example, and thus to save the transmissions or to make them more durable or, where necessary, to set the motor more severely to more strongly counteract the dynamic effects in the drivetrain. Different parameters can optionally also be considered for the adjustment of the motor characteristic by the speed regulators in dependence on which the characteristic line adjustment then takes place.

The higher-ranking speed regulator and/or the speed regulators specific to the motors can be configured, for example, in the form of a P regulator. A limiting module can advantageously be arranged downstream of the P regulators specific to the motors that provides a limit with respect to the desired torque provided to the motor.

Such a P speed regulator can in particular be provided to influence the gradation of the characteristics of the actuating drives. A speed difference dependent on the P portion can be specified to achieve a specific bracing torque.

In view of the intelligent control or regulation of the bracing of the actuating drives, the adjustment and/or drive unit can manage without a service brake or can carry out adjustment procedures without applying a service brake even though such a service brake can nevertheless be provided.

Independently of the presence of such a service brake, the adjustment and/or drive unit can have a standstill brake, for example in the form of a latch or a holding brake that acts in a shape-matched manner and that can advantageously, however, also be actuated in an automated manner on longer standstill times or optionally also on only shorter standstill times. For example, such a standstill brake can block the aforesaid large roller bearing and/or large plain bearing to relieve the actuating drives and any transmissions present and/or can be associated with a transmission between the actuating drive motor and the drive pinion or drive gear to hold a transmission shaft firmly. Alternatively or additionally, the standstill brake can optionally also engage at one or more actuating drive motors.

Said actuating drives can each have an electric motor in an advantageous further development of the invention. Alternatively, however, it would also be possible to provide hydraulic motors. Independently of this, the actuating drives can also comprise one or more transmission stages to step up or step down the motor speed to the desired pinion or drive gear speed.

To additionally counteract the unwanted movements in the drivetrain and the dynamic effects resulting therefrom and to support the regulation of the actuating drive bracing and to simplify the service and repair, provision can be made in accordance with a further aspect of the present invention to combine the at least two actuating drives, the assemblies hereby rotatable with respect to one another, and the control device including the optionally provided plurality of speed regulators to form a preassembled installation module or installation assembly that can be assembled in the manner of a plug and play module between the two turbine parts to be rotated with respect to one another, in particular between the tower of a wind turbine and its nacelle or a tower piece bearing the nacelle. The assemblies integrated in the installation module and rotatable with respect to one another advantageously comprise connector means for this purpose by means of which said further turbine components can be connected to the installation module in a simple manner. These connector means can in particular comprise mechanical fastening means, for example releasable pin connections. The connector means can, however, also comprise electrical and/or technical signal and/or technical energy-supply connector means such as power line connectors, signal line connectors and/or hydraulic connectors so that the installation module can be connected or can be linked in a simple manner to the turbine components to be connected.

To increase the internal torsion stiffness of the actuating drives, an at least approximately symmetrical take-up of the load at the drive gear at the output side can in particular be provided in an advantageous further development of the invention by a mounting at both sides. An output shaft of the actuating drive, in particular of the transmission of the actuating drive at which said drive gear, in particular a drive pinion, is provided, can in particular be radially supported by bearings at both sides of the drive gear, with an axial component optionally also being able to be additionally intercepted for a radial support.

The bearings provided at both sides can here be integrated in the respective actuating drive unit, for example, can support the shaft bearing the output pinion at both sides of the drive pinion at a housing of the drive unit, in particular its transmissions. Alternatively, at least one of the bearings can also be supported directly at the assembly to which the actuating drive unit is fastened. For example, the assembly can here comprise a reception container and/or two mutually spaced apart bearing carriers into which the actuating drive unit can be placed such that at least one of the bearings can be directly supported at the assembly. Even if both bearings are integrated in the actuating drive unit and its housing and are supported thereat, the assembly to which the actuating drive unit is fastened can have such a bearing container or such provided bearing carriers to preferably fixedly support the actuating drive unit in the region of the two said bearings. A direct force flow and a direct introduction of the bearing forces into said assembly can hereby take place.

The previously named mutually rotatable assemblies can, for example, form or comprise or be fastened to bearing races of a larger roller bearing and/or large plain bearing, with the actuating drives advantageously being able to be arranged within the inner space bounded by the bearing races. Such a large roller bearing and/or large plain bearing can, for example, form an azimuth bearing that, on the one hand, can have connector means for connection to an upper end section of a tower of a wind turbine and/or, on the other hand, connector means for connecting the wind turbine nacelle and/or a tower piece bearing the nacelle.

In general, the adjustment and/or drive unit can, however, also be used for other adjustment work, for example as a slewing gear or a rotary drive of a crane or of an excavator, although said use as an azimuth adjustment drive and/or pitch angle adjustment drive of a wind turbine brings about special advantages.

Not only an increased stiffness of the mounting of the assemblies to be connected that reduces the unwanted dynamic effects can be achieved by the combining of said components of the adjustment and/or drive unit to form a pre-assembled installation module, but various further advantages can also be achieved, for example smaller bearing sizes by a stiff connector construction at the bearing. On the one hand, the installation of the individual components can already take place at the turbine manufacturer's, whereby a considerable logistical advantage results. On the other hand, more room remains in the wind turbine nacelle or in the equipment pod since the actuating drives are transposed into said installation module between the tower and the equipment pod. Escape routes can hereby be increased and the access to the main drivetrain of the turbine can hereby be facilitated.

On the other hand, the drives attached in the pre-assembled installation group are more easily accessible, whereby servicing, repair, and replacement are facilitated. However, the softness and the resilience of the previously customary mounting of the actuating drives and of the azimuth bearing such as current machine carriers of conventional wind turbines bring about can in particular be avoided.

Figure 1:
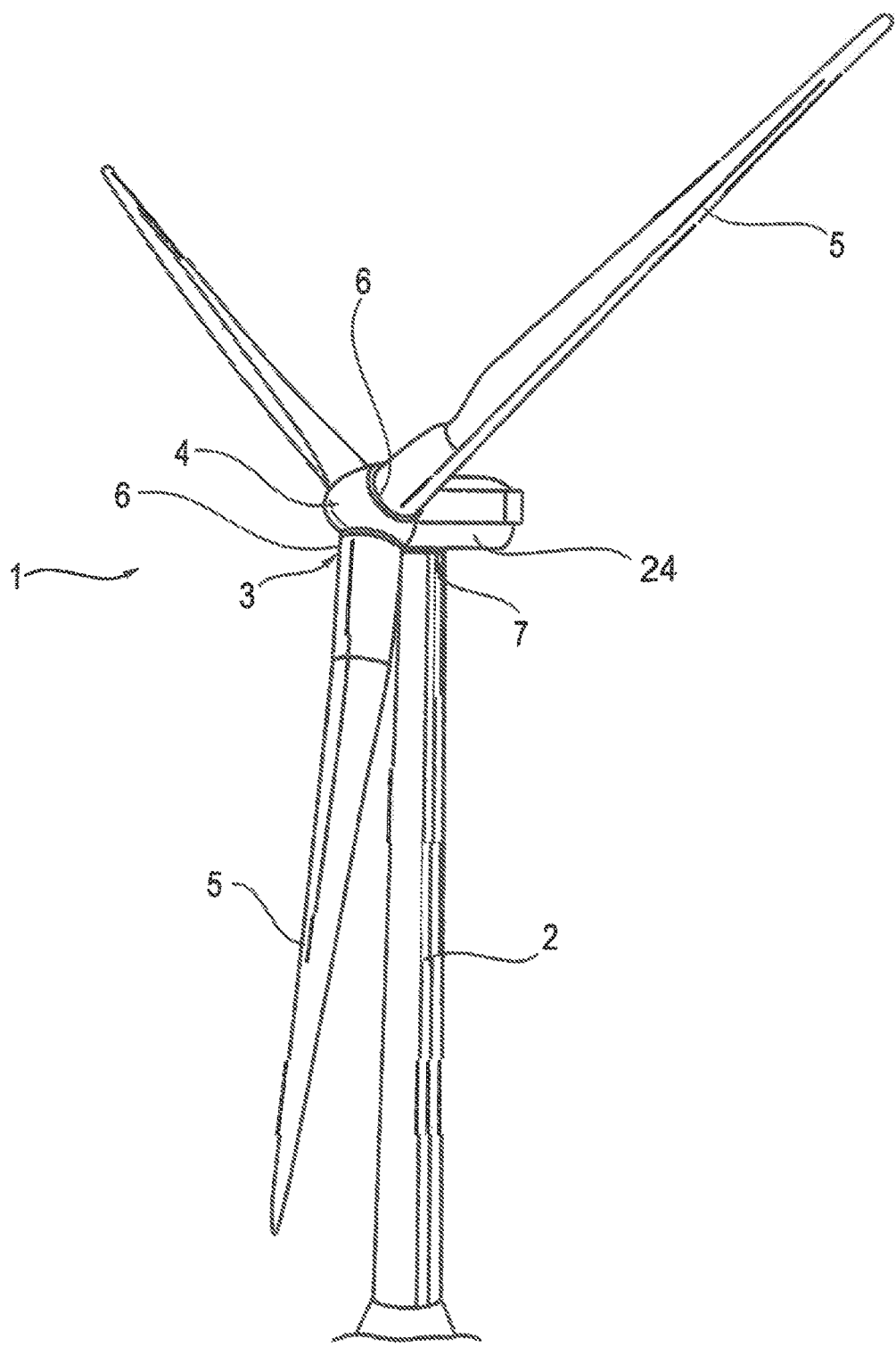
Figure 2:
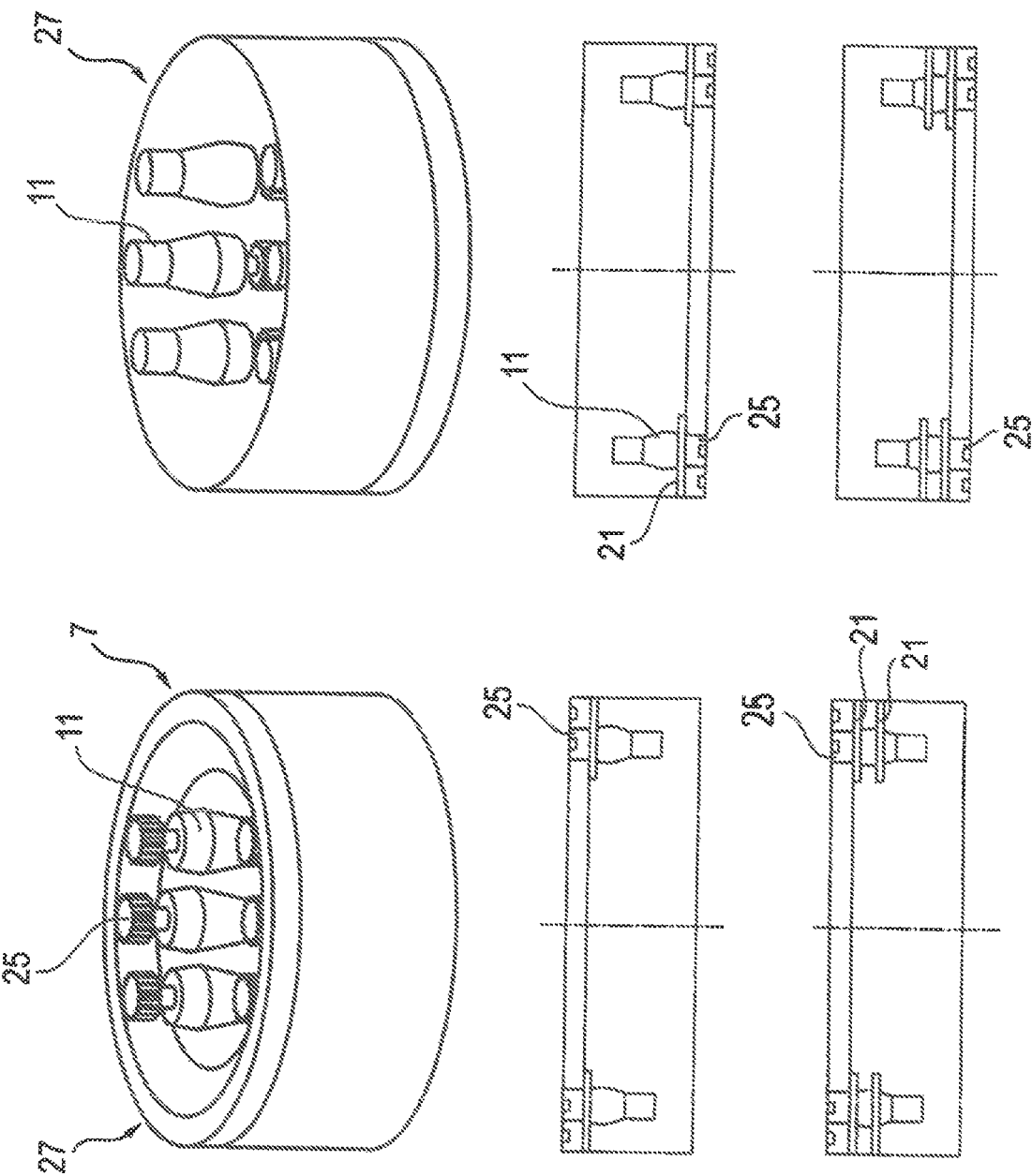
Figure 3:
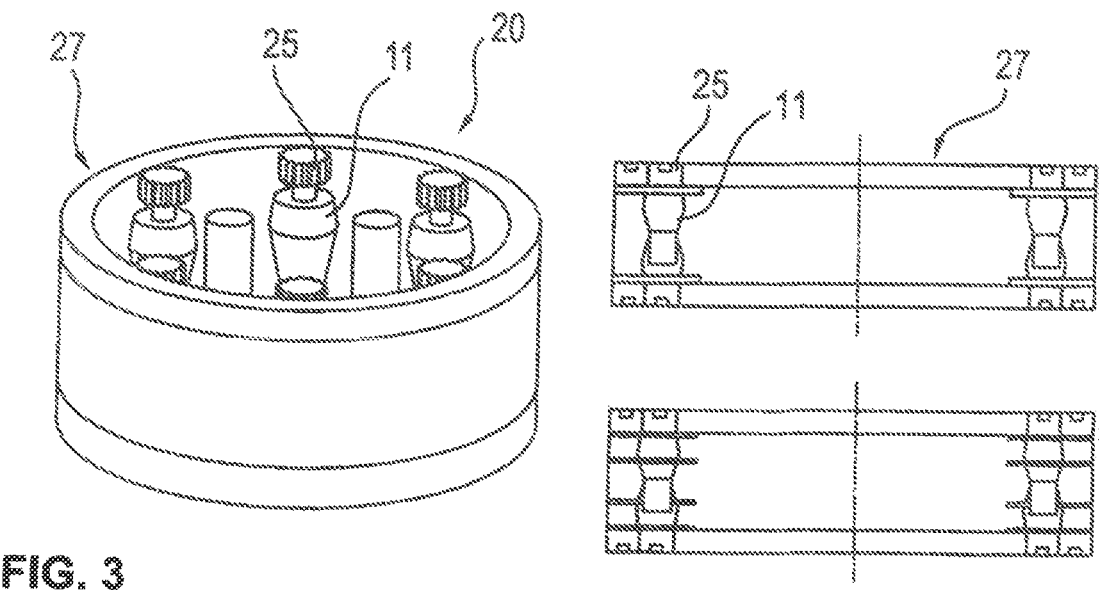
Figure 6:
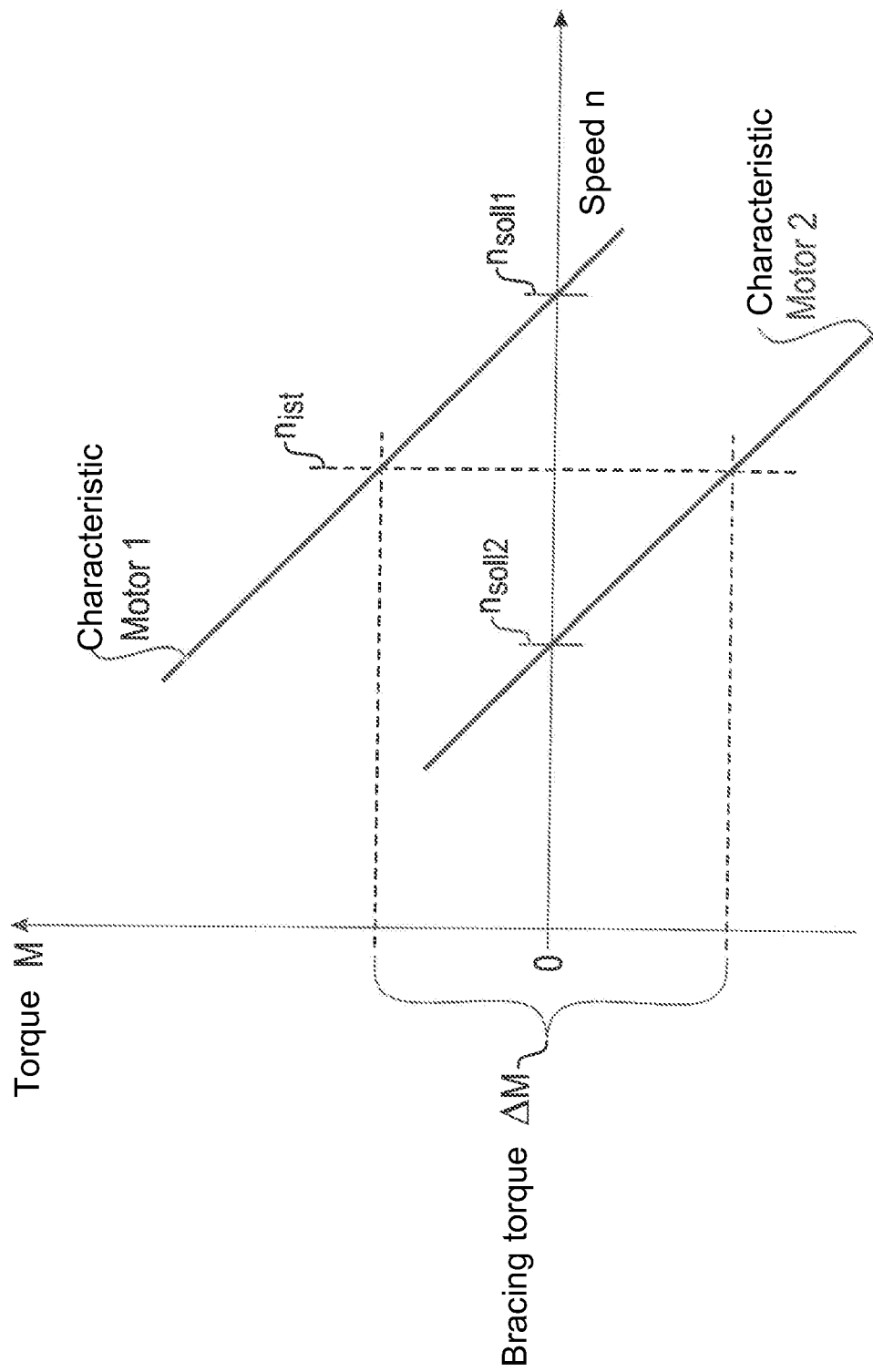
Figure 7:
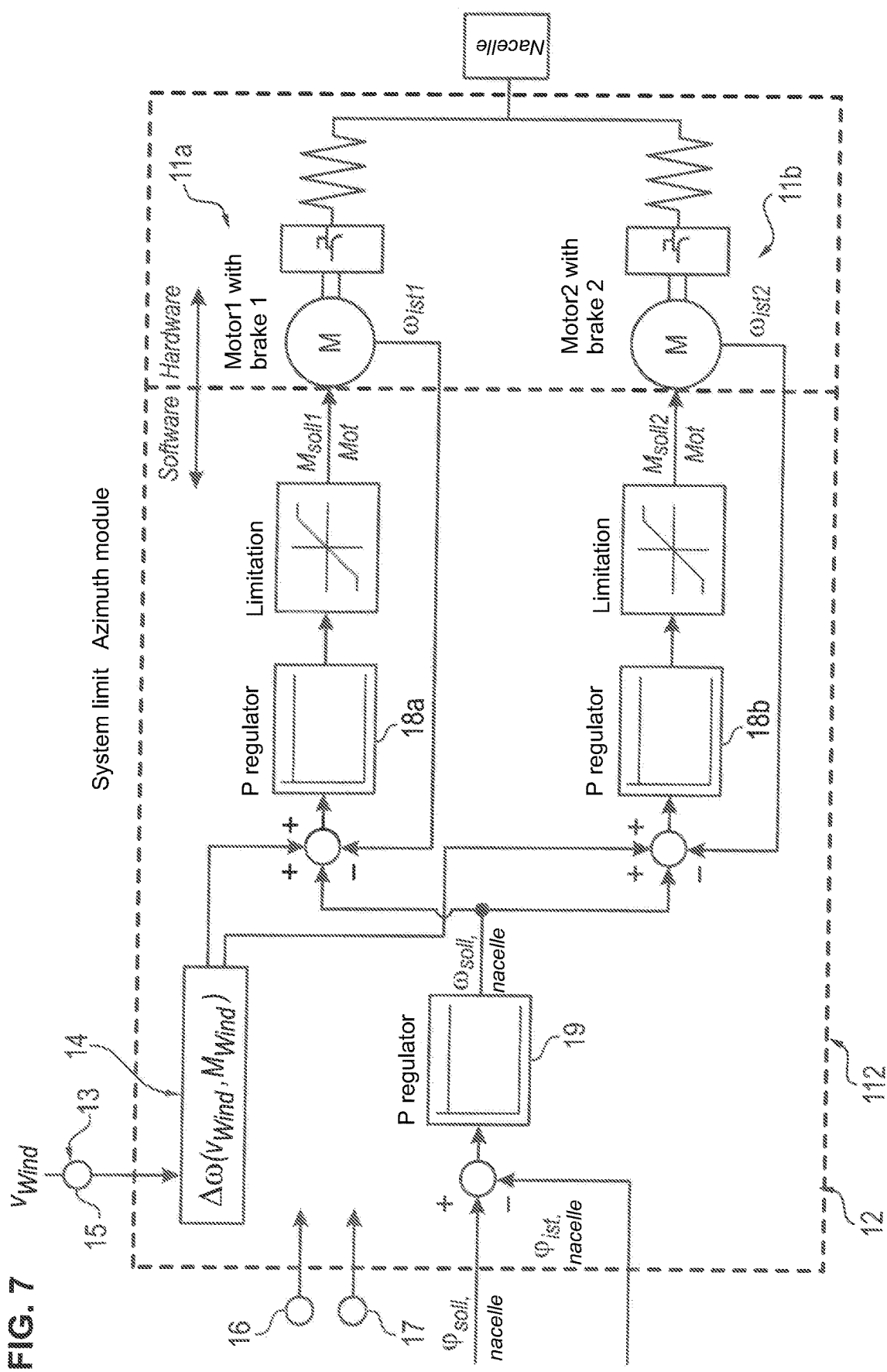
Figure 8:
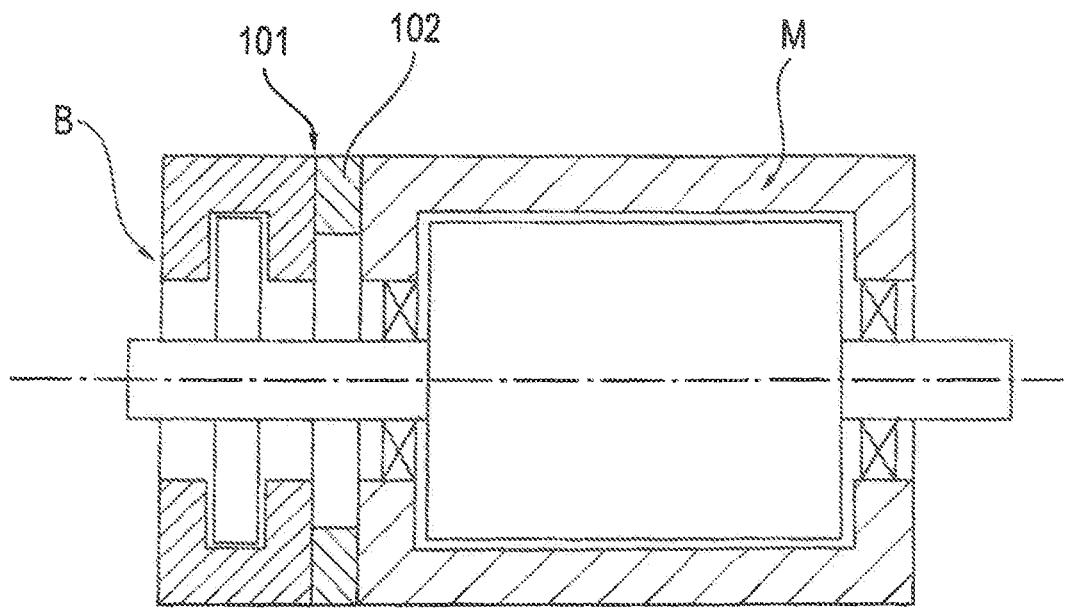
Figure 8:
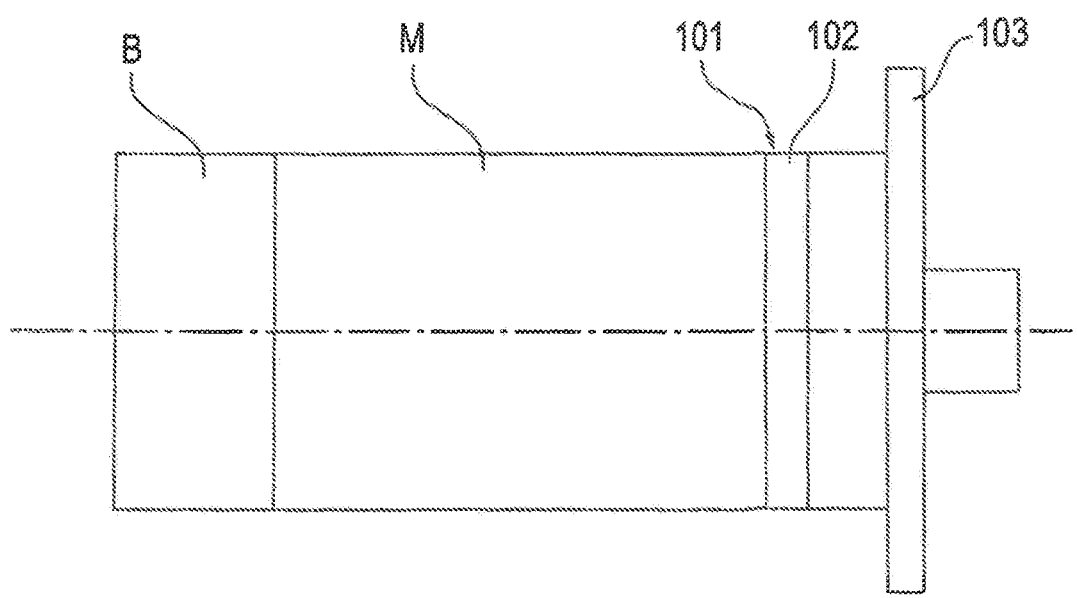
Figure 8C:
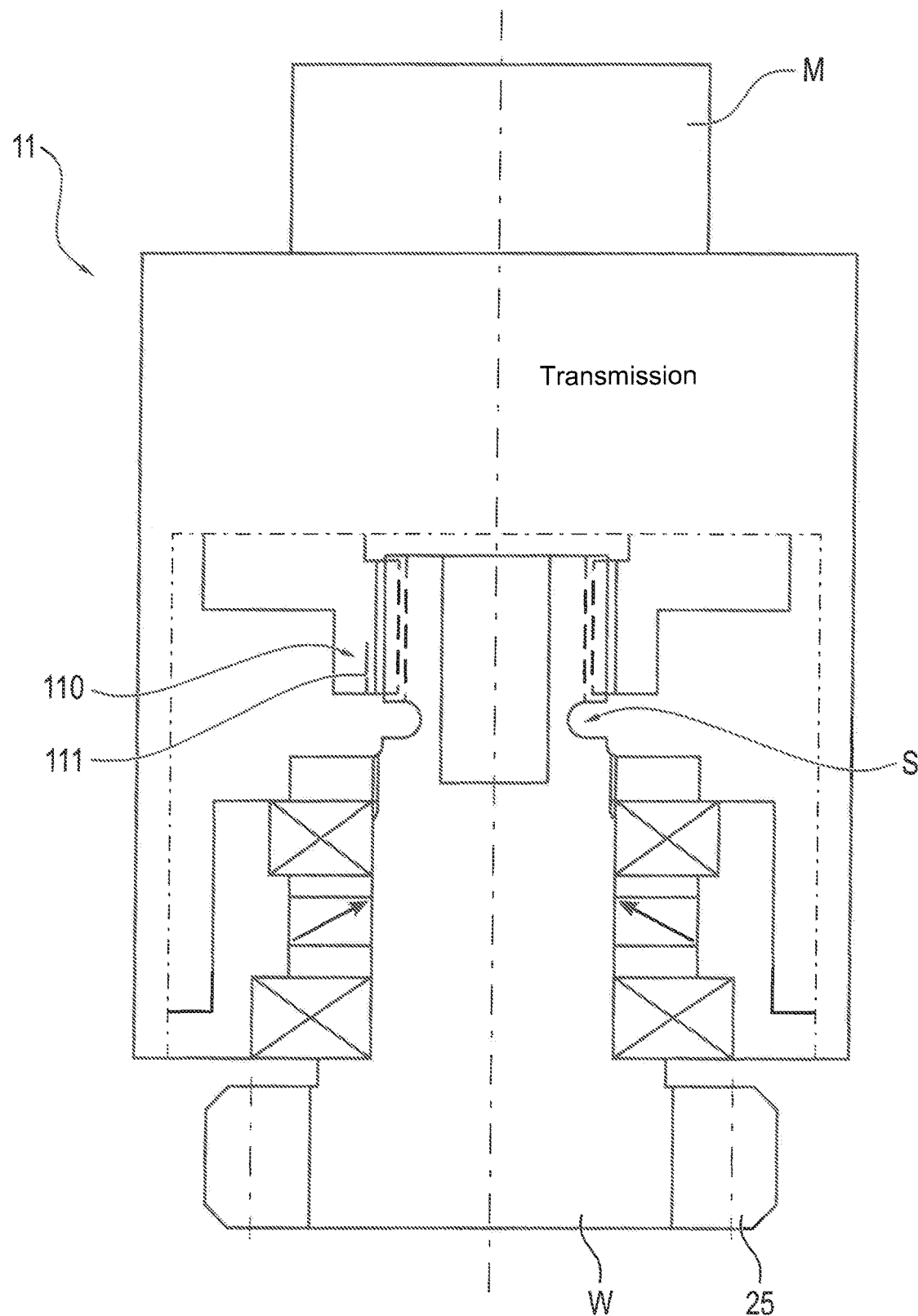
Figure 9:
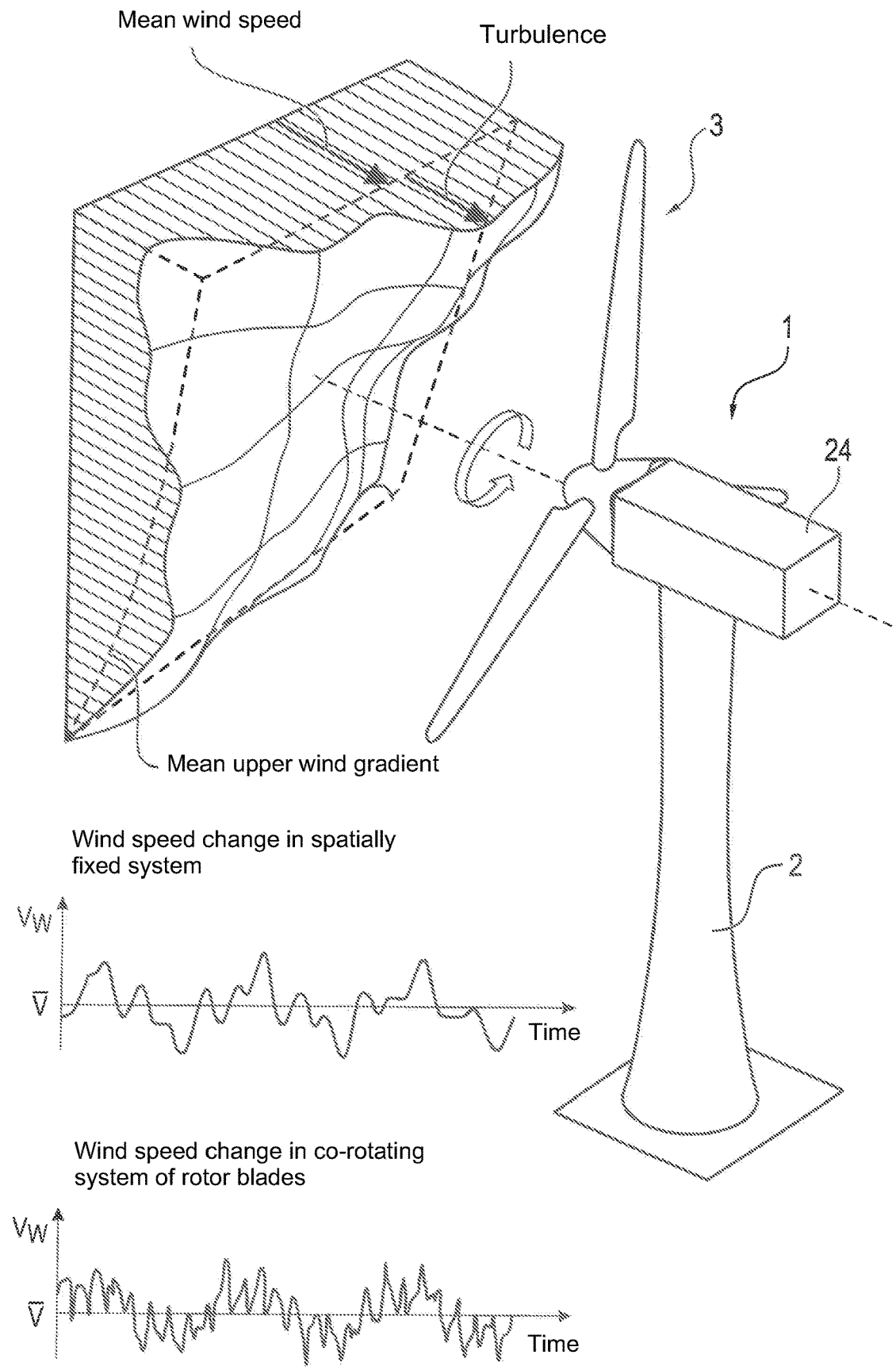

The invention will be explained in more detail in the following with respect to preferred embodiments and to associated drawings. There are shown in the drawings:

FIG. 1: a schematic perspective representation of a wind turbine that comprises an adjustment and/or drive unit for adjusting the azimuth angle of the nacelle that is configured as an azimuth installation module in an advantageous further development of the invention;

FIG. 2: a schematic representation of the azimuth installation module of FIG. 1 in different installed positions;

FIG. 3: a schematic representation of an azimuth module similar to FIG. 2 in accordance with a further configuration of the invention in accordance with which the actuating drives are integrated in the module oriented in opposite senses to one another;

FIG. 4: a schematic representation of an actuating drive of an azimuth module from the preceding Figures, with the plain bearing between the cog and the housing ring being shown and a support of the drive pinion at only one side being shown in part view (*a*) and with a symmetrical two-sided mounting of the drive pinion of an actuating drive unit that is fastened to an azimuth module being shown in part view (*b*), with the part view 4(*c*) showing two further advantageous installation options of an actuating drive with roller and plain bearings, the further part view 4(*d*) showing a bearing race for the actuating drives with bearing recesses provided therein, and the part view 4(*e*) showing said bearing race in cross-section with actuating drives installed therein; furthermore part view 4(*f*) showing the arrangement of the connection pins in the bearing race; furthermore part view 4(*g*) showing a further installation option for the actuating drives and the fixing by means of pins to the outer ring of the rotary unit, and FIG. 4(*h*) showing a bearing race similar to part view 4(*d*) in accordance with a further embodiment, according to which said bearing race having notch-like bearing recesses open to one side for the actuating drives so that the actuating drives can be pushed in transversely to the axis of rotation of the rotary unit;

FIG. 5: a schematic representation of an azimuth module with a total of six actuating drives, with the actuating drives being shown in different bracing states to illustrate the step-wise switching over of the bracing;

FIG. 6: a speed-torque diagram in which the motor characteristics of differently controlled actuating drives and the bracing torque resulting herefrom are shown;

FIG. 7: a schematic representation of the control or regulation device for controlling or regulating the actuating drives of the adjustment and/or drive unit from the preceding Figures;

FIG. 8: a schematic, cut sectional view of an actuating drive unit that has a torque measuring device for also measuring the induced torque in the standstill, with a measuring flange being provided as a torque measuring device between a brake and the motor of the actuating drive unit in part view (a), and a corresponding measuring flange being provided between the stator or the motor housing and a connector flange in part view (b), and with the arrangement of a load sensor being shown in part view (c);

FIG. 9: a perspective schematic representation of a wind field inducing the external loads of the adjustment and/or drive unit of the wind turbine, with a diagram-like representation of the associated wind speed changes in a spatially fixed system and a diagram-like representation of the wind speed changes in a co-rotating system of the rotor blades of the wind turbine being shown in addition to a topographic representation of the wind field; and FIG. 10: a perspective schematic representation of the direct communication of the intelligent actuating drives between one another to provide in the event of an overload risk of one actuating drive, a supporting and relieving torque directly at the other actuating drives.

As FIG. 1 shows, the rotor 3 of a wind turbine 1 can be mounted rotatably about a horizontal rotor axis at a nacelle 24 or at an equipment pod that is arranged on a tower 2 and can be rotated about an upright axis to be able to align the rotor 3 with respect to the wind direction. The generator, control assemblies therefor, and additional energy converter assemblies and auxiliary assemblies can be accommodated in said nacelle 24 in a manner known per se.

The rotor hub 4 rotatably mounted about the horizontal rotor axis at the nacelle 24 bears a plurality of rotor blades 5 that are rotatably mounted at the rotor hub 4 about longitudinal rotor blade axes so that the angle of attack or the pitch angle of the rotor blades can be adapted to the operating conditions, in particular to the wind strength ad to the switch-on status of the wind turbine. Pitch adjustment and/or drive units can be provided in a manner known per se for this purpose.

To move the nacelle 24 into the desired angular position, i.e. to travel to a desired azimuth angle, an adjustment and/or drive unit 20 is provided between the tower 2 and the nacelle 24 that is configured and pre-assembled as an azimuth installation module and includes an azimuth bearing 7 that provides the upright axis of rotation for the nacelle 24 with respect to the tower 2. Said azimuth bearing 7 can here be configured as a large roller and/or plain bearing and can comprise two bearing races 8 and 9 that are mounted rotatably with respect to one another, for example by the plain bearing 10 shown in FIG. 4(*a*) or the roller bearing 110 shown in FIG. 4(*b*).

Said bearing races 8 and 9, optionally with module housing rings rigidly attached thereto, define a—roughly speaking—cylindrical inner space in which a plurality of actuating drives 11 for rotating the bearing races 8 and 9 with respect to one another are received and have suitable connector means to be fastened to the tower 2 or to the nacelle 24 or to a tower piece bearing it.

As the part view (*a*) of FIG. 4 shows, the actuating drives 11 can, for example, be fastened to two mutually spaced apart bearing carriers 21 that can, for example, be formed in plate-like shape. The actuating drives 11 can comprise electric motors 22 that drive a pinion 25 via a transmission 23, said pinion 25 meshing with a cog 26 that is rigidly connected to the other one of the two bearing races so that a rotation of the pinion 25 results in a rotation of the two bearing races 8 and 9 with respect to one another.

As the part view (*b*) of FIG. 4 shows, the output pinion 25 of a respective actuating drive 11 can advantageously also be supported or mounted at both sides, in particular mounted at least approximately symmetrically. In this respect, a bearing L1 provided at the transmission side can support the shaft W bearing the pinion 25 in the housing of the actuating drive 11, in particular its transmission housing. In addition to this bearing L1 at the transmission side, the shaft W bearing the pinion 25 can be supported by a second bearing L2 that is located on the side of the pinion 25 remote from the transmission 23. This additional bearing L2 can generally likewise be provided in and supported at a section of the transmission housing. As the part view (*b*) of FIG. 4 shows, said bearing L2 can, however, also be provided in a section of the azimuth module A to support the pinion 25 or the shaft W directly at the azimuth module. The azimuth module A can for this purpose have a bearing container TO that extends into the tower 2 and into which the actuating drive 11 can be inserted with said shaft W. Alternatively, the assembly or connection interface can also be placed at a different point. For example, the output shaft W shown in FIG. 4(*b*) can form an assembly integrated into the azimuth module A via the bearings L1 and L2 and can be brought into engagement with an output element of the actuating drive 11, for example a planetary carrier of the last transmission stage, by means of a plug-in toothed connection.

The bearings L1 and L2 provided at both sides of the pinion 25 can advantageously be directly supported at structural carrier parts of the azimuth module A to effect a direct force flow.

It would also be possible in a kinematic reversal of the embodiment in accordance with FIG. 4(*b*) to fasten the actuating drive 11 in an analog manner not to the azimuth module, but rather to the tower module to which the azimuth module is connected.

It would furthermore be possible to upend the arrangement shown in FIG. 4(*b*) and to arrange the actuating drive 11 upside down, so-to-say, as FIG. 2 illustrates in a similar manner.

Part view FIG. 4(*c*) shows further installation options with a suspended actuating drive arrangement, according to which the actuating drives are installed with an upwardly disposed drive pinion so that the output shaft W extends downwardly from the pinion 25 to the transmission 23 disposed below the pinion 25. The electric motor 22 can in turn be disposed beneath the transmission 23.

The actuating drive 11 arranged in a suspended manner is here in turn held at a bearing race 9a shown in part view 4(d) that can be fastened, for example, to the upper end of a tower and can be connected to the standing bearing race 9, with a pin connection B being able to simultaneously fasten the bearing races 9 and 9a to one another and to the tower, cf. FIG. 4(c). The two variants shown in FIG. 4(c) differ from one another in that the rotatable bearing race 8 that is driven by the pinion 25 is supported at the standing bearing race 9 by means of roller bearings or by means of plain bearings. The support can here take place with respect to one or both parts 9 and 9a as, for example, the right side and the plain bearing arrangement shown there illustrate.

As part view 4(d) illustrates, the bearing race 9a can have recesses in which the actuating drives 11 can be pushed or inserted in the direction of the longitudinal axis of the actuating drives, can in particular be downwardly removed or upwardly inserted. In addition, said bearing race 9a can have a plurality of pin recesses to be able to insert the pins of the pin connection B.

The sectional view of part view 4(e) shows the actuating drives 11 seated in the recesses of the bearing race 9a and the pin connection B, with the part view 4(f) showing that the bearing race 9a for the actuating drives 11 can be pre-assembled at the bearing race 9, for example by pins in every sixth pin hole, where threads can be provided to enable the pre-assembly. On the assembly at the tower, all the pins can then be placed and be secured by nuts such as the right part view of FIG. 4(f) shows.

In accordance with part view 4(g), the bearing race 8 to be rotated can also form the outer race, while the fixed bearing race 9 can be inwardly arranged.

As part view 4(h) shows, the bearing race 9a can also have open recesses Z toward one side—in particular toward the inner side—into which the actuating drives can be pushed transversely to their longitudinal axes. If the bearing race or bearing container 9a is installed in a horizontal orientation, the actuating drives 2 can be horizontally pushed into the recesses Z, with the actuating drives 2 being able to comprise sufficiently large collars—oval in the drawn embodiment—that cover the slot-shaped or notch-like recesses, cf. FIG. 4(h).

As FIG. 2 shows, the actuating drives 2 can generally be installed differently or the pre-assembled azimuth module can adopt different installation positions, for example such that the pinions 25 come to lie above the electric motors 22 and/or come to lie at an upper marginal section of the installation module 27. Alternatively, a reverse installation situation can also be provided with a downwardly disposed drive pinion or pinions disposed at the lower end section of the installation module 27, cf. FIG. 2. Depending on the installation position of the installation module, the actuating drives 11 can be arranged in a fixed position with the tower 2 or can be arranged co-rotating with the nacelle 24.

The actuating drives 11 can here be fastened to only one holding carrier or bearing carrier 21 or, as shown in FIG. 4, at two mutually spaced apart bearing carriers 21.

As FIG. 3 shows, actuating drives can also be provided that are arranged in opposite senses to one another so that a lower group of the actuating drives 11 has an upwardly disposed pinion or the pinion 25 at the upper end section of the installation module 27 and a different group of the actuating drives has a downwardly disposed pinion 25.

As FIG. 7 shows, in which only two actuating drives 11 are shown by way of example, a control device 12 that can likewise be integrated in the installation module 27 can have a plurality of speed regulators 18a and 18 specific to the motors so that a separate speed regulator is associated with each actuating drive 11. These speed regulators 18a and 18b specific to the motors can, for example, be configured as P regulators and can comprise a limiting stage 28 that is arranged downstream and that can limit the desired torque $M_{soll}$ provided to the actuating drives 11. Said speed regulators specific to the motors specify a torque for the respective associated actuating drive 11 and receive back the respective measured speed $\omega_{ist}$ of the respective actuating drive 11.

A higher-ranking speed regulator 19 specifies a desired speed $\omega_{soll}$ for each speed regulator 18a and 18b specific to the motors, with a bracing being able to be implemented by the specification of different desired speeds, as is illustrated in FIG. 6. The speed regulators 18a and 18b specific to the motors can influence the characteristic of the respective actuating drive 11 to hereby set the actuating drive more smoothly or more severely to be able to correspondingly save the transmission and make it more durable or to implement just such a harsher bracing.

The desired speeds of two actuating drives 11 can here differ, for example, by approximately 100 to 500, or even a lot more, for example 3000 revolutions per minute or also more, with the motor characteristic changing, in particular being able to be set flatter, by the speed regulators 18a and 18b specific to the motors. As FIG. 6 illustrates, bracing torque ΔM can be implemented by the adjustment of the motor characteristics that can be shifted in accordance with the specified different desired speeds.

The higher-ranking speed regulator 19 can here likewise be configured as a P regulator and can form, together with the speed regulators 18a and 18b specific to the motors, a bracing setting device 14 with the aid of which the bracing of the actuating drives can be variably set in the desired manner, as initially explained in detail.

As FIG. 7 shows, the higher-ranking regulator 19 can here receive the desired signal $\varphi_{soll}$ for the desired azimuth angle or the desired azimuth adjustment and the corresponding actual signal $\varphi_{ist}$ at the input side that is then converted into the desired speeds $\omega_{soll}$ for the speed regulators specific to the motors. In this respect, the external load can be taken into account by the higher ranking regulator 19, with in particular a wind signal, for example the wind speed $V_{wind}$ and/or a probable wind torque that results therefrom or that is related thereto and that engages at the nacelle and/or at the rotor being able to be taken into account, from which a spread of the desired speed or different desired speeds is/are determined for the different speed regulators 18 specific to the motors to set the bracing in the desired manner.

As FIG. 5 illustrates, the bracing setting device 14 can here vary the number of actuating drives 11 that drive the adjustment of the desired direction of rotation onward and the number of actuating drives 11 that act against such an adjustment. For example, with wind loads moving to and fro and with an overall load at the same side or symmetrical, the same number of actuating drives can work in the desired direction of rotation as against the desired direction of rotation, cf. the representation at the top left in FIG. 5 according to which three actuating drives 11 work against three actuating drives 11. The actuating drives working in the one direction of rotation are hatched to the left (i.e. with a hatching from the bottom right to the top left) therein, while the actuating drives working or braking in the opposite direction are hatched to the right to illustrate the group-wise bracing and its variability in FIG. 5.

Depending on the wind load and/or on loads and/or on a desired bracing, however, different constellations can also be set such as five against one, four against two, or six against zero, cf. FIG. 5, the further part representations there.

Depending on the configuration of the wind field and the attack of the rotor on the wind field, different wind loads, and load amplitudes can be produced. As FIG. 9 illustrates, a wind field is as a rule, viewed over a relevant cross-section—for example the cross-sectional region swept over by the rotor blade—not uniform, but displays different wind speeds at different points of this cross-section, with the wind speed not only being able to increase over the height, but also vary transversely thereto. As the two diagram-like representations of FIG. 9 illustrate, the wind speed changes in the spatially fixed system here imply wind speed changes derived therefrom in the co-rotating system of the rotor blades.

While on an observation of the (limited) cross-section at a specific point in time, the wind field can have an approximately homogeneous wind direction, i.e. a wind direction hardly changing over the cross-section, in this limited cross-section and is substantially characterized by the different wind speeds, rotating wind directions also arise viewed over time.

Asymmetrical, i.e. substantially unilateral, wind loads are primarily produced by an oblique onflow onto the rotor, which can, for example, take place by a turning of the wind direction.

Load amplitudes are primarily produced by the irregular distribution of the wind speed on the rotor surface, as FIG. 9 illustrates. The wind speed is highest at the top right in FIG. 9, for example. Whenever a rotor blade runs through this higher wind speed in the sector at the top right, a torque is hereby produced on the azimuth drive. To be able to better monitor these fluctuations, the adjustment and/or drive unit can brace the actuating drives 11 in relation to each other in the initially exhaustively explained manner and can variably control the bracing using the likewise initially explained parameters.

As FIGS. 8(*a*) and (*b*) show, the actuating drives can have brakes B to be able to relieve the motors M at a standstill and/or to be able to hold an angular position traveled to. As initially explained, the adjustment and/or drive unit can, however, generally also be held at a standstill without the effect of such brakes B by the actuating drives 11 themselves or by their motors.

To also be able to precisely measure the loads acting at a standstill with motors M switched off, torque measurement devices 101 can be associated with the actuating drives 11, for example in the form of measuring flanges 102. FIG. 8(*a*) here shows an installed variant of such a measuring flange 102 between the brake housing of the brake B and the stationary motor housing of the motor M.

Alternatively, such a measuring flange 102 can also be provided between the motor housing of the motor M and a connector flange 103 to measure the torque acting between the motor housing and said connector flange. Such an attachment variant has the advantage that the torque can also be determined with a released brake B, that is, when the torque is transmitted in operation of the motor between the output shaft and the motor housing over the air gap of the motor M.

As FIG. 8(*c*) shows, sensor elements 111 that can also measure the load and/or the torque and/or forces with rotating or moving drives can also be provided on each of the actuating drives 2 alternatively or additionally to said torque measuring devices 101 as load determination devices 110. Such measuring elements 111 can in particular each be associated with the output shaft W of the actuating drives 2 to be able to measure the load between the output pinion and the transmission. Said measuring elements 111 can here comprise torsion gauges for measuring the torsion of the shaft or force gauges or strain gauges or similar to measure load-relevant forces and/or torques and/or deformations.

Said load determination devices 110 here form a part of an overload protection apparatus 112 that protects the individual actuating drives 11 from overload and report the respective load state of the respective actuating drive 2 to the control device 22, on the one hand, that controls the actuating drives 2 and distributes the drive torques variably to the plurality of actuating drives 2 and, on the other hand, directly to the other actuating drives 11, at least when the load signal 110*s* indicates the reaching of an overload.

To avoid overload states, the actuating drives 11 communicate directly with one another to provide auxiliary torque in a decentralized manner that relieves the actuating drive threatening to move into overload. The actuating drives 11 for this purpose each have a decentralized control module 11*s* that is respectively configured to receive a load signal 110*s* and/or an auxiliary signal from the other actuating drives, in particular from their control modules 11*s* and/or from their load determination device 110.

Said load signals 110*s* can advantageously be evaluated by evaluation units that can be parts of the aforesaid control modules 11*s*. Said evaluation devices can here advantageously be configured to evaluate the respective load signal 110*s* of its "own" actuating drive 11. If the evaluation shows that the actuating drive 11 is threatening to enter into the overload state or has already entered into it, the evaluation device or the control module 11*s* sends an auxiliary signal to at least one of the other actuating drives 11, but advantageously also to all the other actuating drives 11.

The control modules 11*s* of the actuating drives 11 are here configured to check such an auxiliary signal and to convert it into an auxiliary torque $\Delta M$ that relieves the actuating drive seeking help. If the auxiliary signal is simultaneously sent to a plurality of other actuating drives 11, they can in turn communicate with one another to coordinate the provision of the auxiliary torque $\Delta M$, for example such that the auxiliary torque $\Delta M$ is split into a plurality of auxiliary partial torques and is applied by a plurality of actuating drives 11. Alternatively, a comparison of the other actuating drives 11 can take place as to which of the actuating drives 11 has the greatest reserves, whereupon this actuating drive 11 then provides the auxiliary torque $\Delta M$.

Said auxiliary torque $\Delta M$ can be provided particularly fast and almost without delay by such a network-like communication link between the actuating drives 11. The communication path to the higher-ranking control device 12 can in particular be saved.

Nevertheless, the higher-ranking control device 12 can also be advised of the provided auxiliary torque $\Delta M$ and/or of the load states of the individual actuating drives 11, whereupon the control device 12 can adapt the torque distribution or the control of the individual actuating drives.

The drive torque of the actuating drive that is threatening to move into overload can in particular be capped and/or reduced. At least one further actuating drive 2 that is not yet threatening to move into overload is controlled such that it is loaded more when it drives in the same direction as the actuating drive threatening to overload or it becomes less bracing when it acts against the drive threatening to overload, as was initially explained. Said control device 12 can here work over the speed regulators 18 and/or can vary other control parameters such as was initially explained for the bracing of the drives.

If a technical control intervention measure is not sufficient, the overload protection device 112 can also take other measures, for example activating the brakes B shown in FIGS. 8(*a*) and 8(*b*), in particular to be able to intercept a mechanical blocking of the actuating drives 2 without further damage arising.

The actuating drives 2 can furthermore also be provided with predetermined breaking points, in particular in the region of the output shaft W, as FIG. 8(*c*) shows in which reference symbol S shows a predetermined breaking point in the output shaft W in the form of a notch.

The invention claimed is:

1. A unit comprising:
   two actuating/load determination assemblies rotatable relative to one another, each actuating/load determination assembly comprising:
      an actuating drive having a decentralized control module; and
      a load determination device associated with the actuating drive, the load determination device configured to:
         determine a load acting on the actuating drive; and
         provide a load signal representative of the load on the actuating drive;
      wherein the control module is configured for the decentralized adjustment of provided torque in dependence on the load signal of the load determination device; and
   a central control device configured to control the actuating drives;
   wherein the actuating drives are configured to rotate the two actuating/load determination assemblies relative to one another;
   wherein the actuating drives are in communication with one another; and
   wherein the control module of one actuating/load determination assembly is configured to change its torque by an auxiliary torque upon receipt of the load signal from a different actuating/load determination assembly, which load signal from the different actuating/load determination assembly indicates that overloading of the actuating drive of the different actuating/load determination assembly has been reached, the change in torque by the auxiliary torque of the control module of the one actuating/load determination assembly configured to relieve the actuating drive of the different actuating/load determination assembly.

2. The unit in accordance with claim 1, wherein the decentralized control modules of the actuating drives are configured to provide the auxiliary torque at least temporarily to relieve the actuating drive of the different actuating/load determination assembly while disregarding a desired torque specified by the central control device.

3. The unit in accordance with claim 1, wherein the auxiliary torque is a torque sufficient to relieve the actuating drive of the different actuating/load determination assembly from the reached overloading in order to provide overload protection of the actuating drive of the different actuating/load determination assembly.

4. The unit in accordance with claim 1, wherein a level of the auxiliary torque is variably adaptable by the decentralized control module in dependence on the received load signal of the actuating drive of the different actuating/load determination assembly.

5. The unit in accordance with claim 1, wherein at least one of the actuating drives has an evaluation device for:
   evaluating the load signal of one or both of its own load determination device and of the load determination device associated with the actuating drive of the different actuating/load determination assembly; and
   generating one or both of an auxiliary and overload signal for sending to the control module of the actuating drive of the different actuating/load determination assembly.

6. The unit in accordance with claim 1, wherein one or both of the decentralized control modules of the actuating drives and the load determination devices are further configured to send the load signal to the central control device, with the central control device being further configured to adapt a specification of desired torques for the actuating drives in dependence on all the load signals.

7. The unit in accordance with claim 6, wherein the decentralized control modules are configured only to send the load signals to the central control device after adaptation and provision of the auxiliary torques.

8. The unit in accordance with claim 1, wherein the load determination devices each have a respective sensor element for measuring a load acting on an output shaft of the respective actuating drive.

9. The unit in accordance with claim 8, wherein the sensor element has an additional element selected from the group consisting of a force element, a torque element, a strain element, and a torsion measuring element.

10. The unit in accordance with claim 1, wherein a torque determination device for determining a torque induced at the actuating drive in a standstill of the unit is provided for at least one actuating drive.

11. The unit in accordance with claim 10, wherein the torque determination device comprises one of:
    a measuring flange that is arranged between a brake housing and a motor housing of the actuating drive; and
    a measuring flange that is arranged between a motor housing and a connector flange of the actuating drive.

12. The unit in accordance with claim 10, wherein the torque determination device has an angle of rotation sensor for determining a rotation of an output gear at a standstill of the actuating drive.

13. The unit in accordance with claim 3, wherein the control modules are configured to primarily distribute the distribution of the torques according to the aspect of overload protection and modifies the distribution for bracing when the overload protection requires.

14. The unit in accordance with claim 1, wherein the control modules are configured such that the distribution of the torques specified by the central control device is changed for the purpose of overload protection and the auxiliary torque is only determined to be as large as necessary to protect the actuating drive of the different actuating/load determination assembly from overload.

15. The unit in accordance with claim 1, wherein on a complete exploitation of a technical control overload protection, brakes are activated to one or both hold and brake the actuating drives.

16. The unit in accordance with claim 1, wherein the actuating drives each comprise at least one electric motor.

17. The unit in accordance with claim 16, wherein the central control device comprises:
    a speed regulator for each of the actuating drives that is specific to the motor, that specifies a torque for the respective associated actuating drive, and that receives the actual speed of the associated actuating drive back; and a higher-ranking speed regulator that is higher-ranking than the speed regulators specific to the motors and that is configured to specify a desired speed for the speed regulators specific to the motors.

18. The unit in accordance with claim 17, wherein the higher-ranking speed regulator has input channels for receiving a plurality of input signals comprising at least one desired angle of rotation of one of the actuating/load determination assemblies to be rotated and a wind speed signal and a torque signal, and is configured to determine the desired speed for the speed regulators specific to the motors in dependence on the desired angle of rotation, on the wind speed signal, and on the torque signal.

19. The unit in accordance with claim 17, wherein the speed regulators specific to the motors are configured to change motor characteristics of the associated actuating drives in dependence on the desired speeds specified by the higher-ranking speed regulator.

20. The unit in accordance with claim 1, wherein the central control device is configured to distribute torques differently over the actuating drives so that on a rotation of the actuating/load determination assemblies in one or both a desired direction of rotation and at a standstill, at least one actuating drive is operated at a torque in one direction of rotation and at least one actuating drive is operated at a torque in the opposite direction of rotation to brace the actuating drives, with the central control device comprising a central control load determination device for determining a variable external load on the actuating/load determination assemblies and having a bracing setting device for a variable setting of bracing of the actuating drives in dependence on the variable external load on the actuating/load determination assemblies to be adjusted.

21. The unit in accordance with claim 20, wherein the bracing setting device is configured to increase the bracing of the actuating drives step-wise or continuously with one or both an increasing external load and with increasing load fluctuations.

22. The unit in accordance with claim 20, wherein the central control load determination device has a wind detection device for detecting wind strength; and wherein the bracing setting device is further configured to increase the bracing of the actuating drives as the wind strength increases.

23. The unit in accordance with claim 20, wherein the central control load determination device has a wind detection device for detecting one or both wind direction and wind loads, and the bracing setting device is configured on wind loads oscillating to and from to set a symmetrical bracing in which the same number of actuating drives are operated at a torque in the one direction of rotation as different actuating drives are operated at a torque in the opposite direction of rotation, and on wind loads that result in a unilateral load of the actuating drives, to set an asymmetrical bracing in which a different number of actuating drives are operated at a torque in the one direction of rotation as actuating drives are operated at a torque in the other opposite direction of rotation.

24. The unit in accordance with claim 20, wherein the central control load determination device has a load amplitude determiner to determine load amplitudes arising at at least one of the actuating drives; and wherein the bracing setting device is configured to increase the bracing of the actuating drives as the load amplitudes increase.

25. The unit in accordance with claim 20, wherein the central control load determination device has a torque determiner to determine a mean torque of the actuating drives; and wherein the bracing setting device is configured to change the bracing of the actuating drives in dependence on the mean torque.

26. The unit in accordance with claim 25, wherein the bracing setting device is configured to brace the actuating drives increasingly asymmetrically.

27. The unit in accordance with claim 25, wherein a switchover control device to switch over the actuating drives between one or both of brake operation and motor operation, and motor operation and brake operation, is provided to monitor a torque induced at the actuating drive and to carry out a switch over of the actuating drives between one or both of brake operation and motor operation, and motor operation and brake operation, in a phase of one or both of minimal torque and a torque low in comparison with the mean torque.

28. The unit in accordance with claim 20, wherein the central control load determination device has a blade angle detection device for detecting an attack or pitch angle of at least one rotor blade; and wherein the bracing setting device is configured to set the bracing of the actuating drives in dependence on a pitch angle detected by the blade angle detection device.

29. The unit in accordance with claim 20, wherein the central control load determination device has a turbine power determination device for determining a wind turbine power; and wherein the bracing setting device is configured to variably set the bracing of the actuating drives in dependence on a wind turbine power detected by the turbine power determination device.

30. The unit in accordance with claim 20, wherein the bracing setting device is configured to set the bracing of the actuating drives by changing the number of actuating drives that are operated at a torque in one or both of the one direction of rotation and the opposite direction of rotation.

31. The unit in accordance with claim 20, wherein the bracing setting device is configured to set the bracing of the actuating drives by a variable changing of the spread of desired speeds of the actuating drives.

32. The unit in accordance with claim 31, wherein the bracing setting device is configured to specify a desired speed for at least one of the actuating drives that differs from a desired speed specified for a different actuating drive by 100 to 500 rpm.

33. The unit in accordance with claim 20, wherein the bracing setting device is configured to change motor characteristics of the actuating drives.

34. The unit in accordance with claim 20, wherein the bracing setting device is configured to specify a first desired torque for at least one of the actuating drives that differs from a second desired torque specified for a different actuating drive by at least 10 N m.

35. The unit in accordance with claim 20, wherein the central control load determination device is configured to determine the variable external load on the unit at a standstill of the unit.

36. The unit in accordance with claim 1, wherein the actuating drives, the two actuating/load determination assemblies rotatable relative to one another, and the control device form a pre-assembled installation module, with the two actuating/load determination assemblies rotatable relative to one another having connector means for connecting to further turbine components.

37. The unit in accordance with claim 36, wherein the actuating/load determination assemblies rotatable relative to one another form bearing races of one of a large roller and large plain bearing; and
  wherein the actuating drives are arranged within an inner space that is bounded by the bearing races.

38. The unit in accordance with claim 37, wherein the one of large roller and plain bearing form(s) an azimuth bearing that, on the one hand, has the connector means configured for connecting to a tower of a wind turbine and, on the other hand, has the connector means configured for connecting one or both an equipment pod of the wind turbine and of a tower piece carrying the equipment pod.

39. The unit in accordance with claim 1, wherein at least one of the actuating drives is fastened to one of the actuating/load determination assemblies and has a drive gear that is in rolling engagement with a ring fastened to the other of the actuating/load determination assemblies and is supported by at least two bearings at both sides of the drive gear.

40. The unit in accordance with claim 39, wherein the two bearings are both fastened to the actuating/load determination assembly to which the actuating drive is fastened.

41. The unit in accordance with claim 39, wherein a shaft carrying the drive gear is configured as one or both releasable from one or both a transmission and motor of the actuating drive and as connectable in a torque transmitting manner.

42. The unit in accordance with claim 40, wherein a torque determination device has a torque measuring flange that is provided one or both between a stator of an electric motor of the actuating drive and a brake and between stator and a connector flange of the actuating drive.

43. The unit in accordance with claim 1, wherein a torque determination device for determining a load torque acting on the actuating drive at a standstill is associated with at least one of the actuating drives.

44. A wind turbine comprising a unit in accordance with claim 1.

45. A method of controlling a unit that is configured as an adjustment unit in accordance with claim 1, wherein the loads of the individual actuating drives are monitored by means of the load determination devices, wherein the actuating drives communicate directly with one another and respond to the load signals of the load determination devices of the different actuating drive, with, on receiving a load signal from another actuating drive that indicates the reaching of an overload of the different actuating drive, the actuating drive receiving the load signal changes its provided torque by the auxiliary torque in dependence on the received load signal so that the different actuating drive is relieved.

46. The method in accordance claim 45, wherein the auxiliary torque is provided while at least temporarily disregarding a desired torque actuating signal of the central control device.

47. The method in accordance with claim 45, wherein, on a rotation of the actuating/load determination assemblies relative to one another and/or at a standstill of the actuating/load determination assemblies, at least one of the actuating drives is controlled such that the actuating drive generates a torque in a first direction of rotation and at least one further of the actuating drives is controlled such that it generates a torque in a second direction opposite the first direction of rotation to brace the actuating drives on a rotation of the actuating/load determination assemblies relative to one another, with a strength of a bracing of the actuating drives relative to one another being variably set in dependence on a variable external load on the actuating/load determination assemblies to be adjusted and/or in dependence on the reaction of the actuating drives to such the variable external load.

* * * * *